（12） United States Patent
Okonogi et al.

(10) Patent No.: US 10,553,876 B2
(45) Date of Patent: Feb. 4, 2020

(54) METHOD AND DEVICE FOR MODIFYING CATALYST LAYER

(71) Applicant: Nissan Motor Co., Ltd.

(72) Inventors: Hiroshi Okonogi, Kanagawa (JP); Aurel Funar, Kanagawa (JP); Yasuhiro Numao, Kanagawa (JP); Tooru Kosemura, Kanagawa (JP); Takayuki Hirao, Kanagawa (JP); Kimio Nishimura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 63 days.

(21) Appl. No.: 15/546,687

(22) PCT Filed: Feb. 2, 2015

(86) PCT No.: PCT/JP2015/052889
§ 371 (c)(1),
(2) Date: Jul. 27, 2017

(87) PCT Pub. No.: WO2016/125240
PCT Pub. Date: Aug. 11, 2016

(65) Prior Publication Data
US 2018/0026273 A1 Jan. 25, 2018

(51) Int. Cl.
*H01M 8/1018* (2016.01)
*H01M 4/88* (2006.01)
(Continued)

(52) U.S. Cl.
CPC ........... *H01M 4/8878* (2013.01); *B05B 5/025* (2013.01); *B05C 5/00* (2013.01); *B05C 11/00* (2013.01);
(Continued)

(58) Field of Classification Search
CPC ....... H01M 2008/1095; H01M 4/8828; H01M 4/8832; H01M 4/8814; H01M 4/8878;
(Continued)

(56) References Cited

U.S. PATENT DOCUMENTS

2014/0127605 A1* 5/2014 Vincent ............... H01M 4/8832 429/479

FOREIGN PATENT DOCUMENTS

CN 103545557 A 1/2014
DE 102012212419 A1 * 1/2014 ............. H01M 4/04
(Continued)

OTHER PUBLICATIONS

Koraishy, Continuous Manufacturing of Direct Methanol Fuel Cell Membrane Electrode Assemblies, https://repositories.lib.utexas.edu/handle/2152/ETD-UT-2010-12-2554, Dec. 2010, Retrieved on Mar. 23, 2018.
(Continued)

*Primary Examiner* — Philip C Tucker
*Assistant Examiner* — Brian R Slawski
(74) *Attorney, Agent, or Firm* — Global IP Counselors, LLP

(57) ABSTRACT

A method is provided that modifies a catalyst layer of a membrane catalyst layer assembly, which is manufactured by transferring the catalyst layer formed on a transfer sheet onto an electrolyte membrane. In the catalyst layer correction method, presence or absence of a defect in the catalyst layer is detected. The defect is removed based on the size and position of the detected defect. The portion from which the defect has been removed is repaired by application thereto of a correcting ink corresponding to the catalyst layer.

11 Claims, 26 Drawing Sheets

(51) Int. Cl.
  *B32B 37/00* (2006.01)
  *B29C 73/02* (2006.01)
  *B29C 65/00* (2006.01)
  *B29C 65/52* (2006.01)
  *B05C 11/00* (2006.01)
  *B05C 5/00* (2006.01)
  *B05B 5/025* (2006.01)
  *B32B 43/00* (2006.01)

(52) U.S. Cl.
  CPC ............ *B32B 37/025* (2013.01); *B32B 43/00* (2013.01); *H01M 4/8814* (2013.01); *H01M 4/8832* (2013.01); *B29C 65/526* (2013.01); *B29C 66/0346* (2013.01); *B29C 73/025* (2013.01); *B32B 2457/18* (2013.01); *H01M 4/8828* (2013.01); *H01M 8/1018* (2013.01); *Y02P 70/56* (2015.11)

(58) Field of Classification Search
  CPC ....... H01M 4/10; H01M 4/1004; Y02P 70/56; B32B 37/025; B32B 2037/243; B32B 2457/18; B29C 73/00; B29C 73/02; B29C 73/025; B29C 2073/264
  USPC ..... 156/60, 94, 98, 150, 151, 155, 230, 235, 156/237, 242, 246, 272.2, 272.8, 277, 156/289; 427/115; 429/480, 482, 483, 429/492, 493, 494, 523, 524
  See application file for complete search history.

(56) References Cited

FOREIGN PATENT DOCUMENTS

| | | |
|---|---|---|
| EP | 2 688 129 A1 | 1/2014 |
| JP | 9-61296 A | 3/1997 |
| JP | 9-262520 A | 10/1997 |
| JP | 2008-78073 A | 4/2008 |
| JP | 2009-48936 A | 3/2009 |
| JP | 2012-195052 A | 10/2012 |
| JP | 2012195052 A * | 10/2012 |
| JP | 2013-20753 A | 1/2013 |
| JP | 2013020753 A * | 1/2013 |
| JP | 2014-190706 A | 10/2014 |

OTHER PUBLICATIONS

Koraishy et al., Manufacturing of Membrane Electrode Assemblies for Fuel Cells, https://www.sutd.edu.sg/cmsresource/idc/papers/2009-_Manufacturing_of membrane_electrode_assemblies_for_fuel_cells.pdf, 2009. Retrieved on Mar. 23, 2018.

* cited by examiner

METHOD AND DEVICE FOR MODIFYING CATALYST LAYER

CROSS-REFERENCE TO RELATED APPLICATIONS

This application is a U.S. National stage application of International Application No. PCT/JP2015/052889, filed Feb. 2, 2015.

BACKGROUND

Field of the Invention

The present invention relates to a method for modifying a catalyst layer and a device for modifying a catalyst layer.

Background Information

In recent years, fuel cells have attracted attention as power sources with low environmental impact. A fuel cell is a clean power generation system in which the product of the electrode reaction is water, thereby, in principle, presenting almost no adverse effect on the global environment. In particular, since polymer electrolyte fuel cells (PEFC) can be operated at relatively low temperatures, such fuel cells are anticipated as power sources for electric vehicles. A polymer electrolyte fuel cell comprises a membrane catalyst layer assembly (CCM: Catalyst Coated Membrane). In which a catalyst layer is formed on an electrolyte membrane. In general, a method in which a catalyst layer, which is formed by coating catalyst ink on a transfer sheet and drying the catalyst ink, is transferred onto an electrolyte membrane is known as a method of manufacturing a membrane catalyst layer assembly.

In this manufacturing method, there is the risk that foreign matter and agglomerates of the catalyst generated in the manufacturing process will be mixed into the catalyst layer on the transfer sheet. If a catalyst layer is transferred onto an electrolyte membrane in a state in which agglomerates and foreign matter are adhered, there is the risk that the electrolyte membrane will become thinner, and pinholes are generated in the membrane catalyst layer assembly. Using such a membrane catalyst layer assembly in a fuel cell can cause a reduction in battery performance.

On the other hand, in the field of liquid-crystal display devices, Japanese Laid-Open Patent Application No. 9-262520 (Patent Document 1) described below discloses a method in which defects that occur in a step to form a color layer on a substrate of a color filter are removed with a laser, after which a minute amount of ink is coated using a coating needle. According to this method, various problems that occur due to defects can be eliminated. However, such a method is not known in the field of fuel cells.

SUMMARY

When a membrane catalyst layer assembly, in which the electrolyte membrane is thinned out as described above, is used in a fuel cell, there is the concern that yield will be reduced at the time of production.

In order to solve the problem described above, an object of the present invention is to provide a method for modifying a catalyst layer and a device for modifying a catalyst layer, which are capable of improving the yield of a membrane catalyst layer assembly at the time of production.

The method for modifying a catalyst layer according to the present invention that achieves the aforementioned object is a catalyst layer correction method of a membrane catalyst layer assembly, which is manufactured by transferring the catalyst layer formed on a transfer sheet onto an electrolyte membrane. In the catalyst layer correction method, the presence or absence of a defect in the catalyst layer is detected, the defect is removed based on the size and position of the detected defect, and the portion from which the defect has been removed is repaired by application thereto of a correcting ink corresponding to the catalyst layer.

In addition, the device for modifying a catalyst layer according to the present invention that realizes the aforementioned object is a catalyst layer correction device for modifying a catalyst layer of a membrane catalyst layer assembly, which is manufactured by transferring the catalyst layer formed on a transfer sheet onto an electrolyte membrane. The catalyst layer correction device comprises a detection unit that detects the presence or absence of a defect in the catalyst layer and a removal unit that removes the defect based on the size and position of the defect that is detected by the detection unit. The catalyst layer correction device further comprises a repair unit that repairs the portion from which the defect is removed by the removal unit by application thereto of a correcting ink corresponding to the catalyst layer.

According to the catalyst layer correction method and the catalyst layer correction device described above, a defect in a catalyst layer is detected and the defect is removed, after which a correcting ink is applied and the defect repaired; the yield of the membrane catalyst layer assembly at the time of production is thereby improved. Therefore, it is possible to provide a catalyst layer correction method and a catalyst layer correction catalyst layer correction device, which are capable of improving the yield of a membrane catalyst layer assembly at the time of production.

DETAILED DESCRIPTION OF THE EMBODIMENTS

Embodiments of the present invention will be explained below, with reference to the appended drawings. In the explanations of the drawings, the same elements are given the same reference symbols, and overlapping explanations are omitted. Dimensional proportions of the drawings are exaggerated for convenience of explanation and may be different from the actual proportions.

First Embodiment

Figure 1:
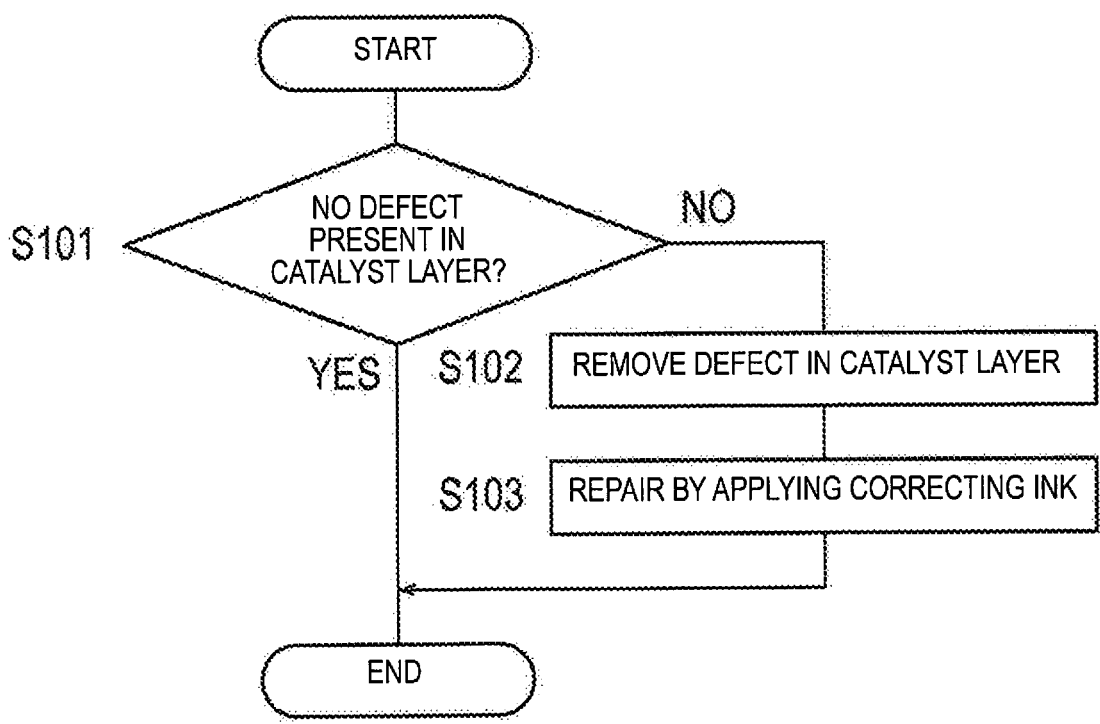
FIG. 1 is a flowchart illustrating the method for modifying a catalyst layer according to a first embodiment of the present invention.
Figure 2:
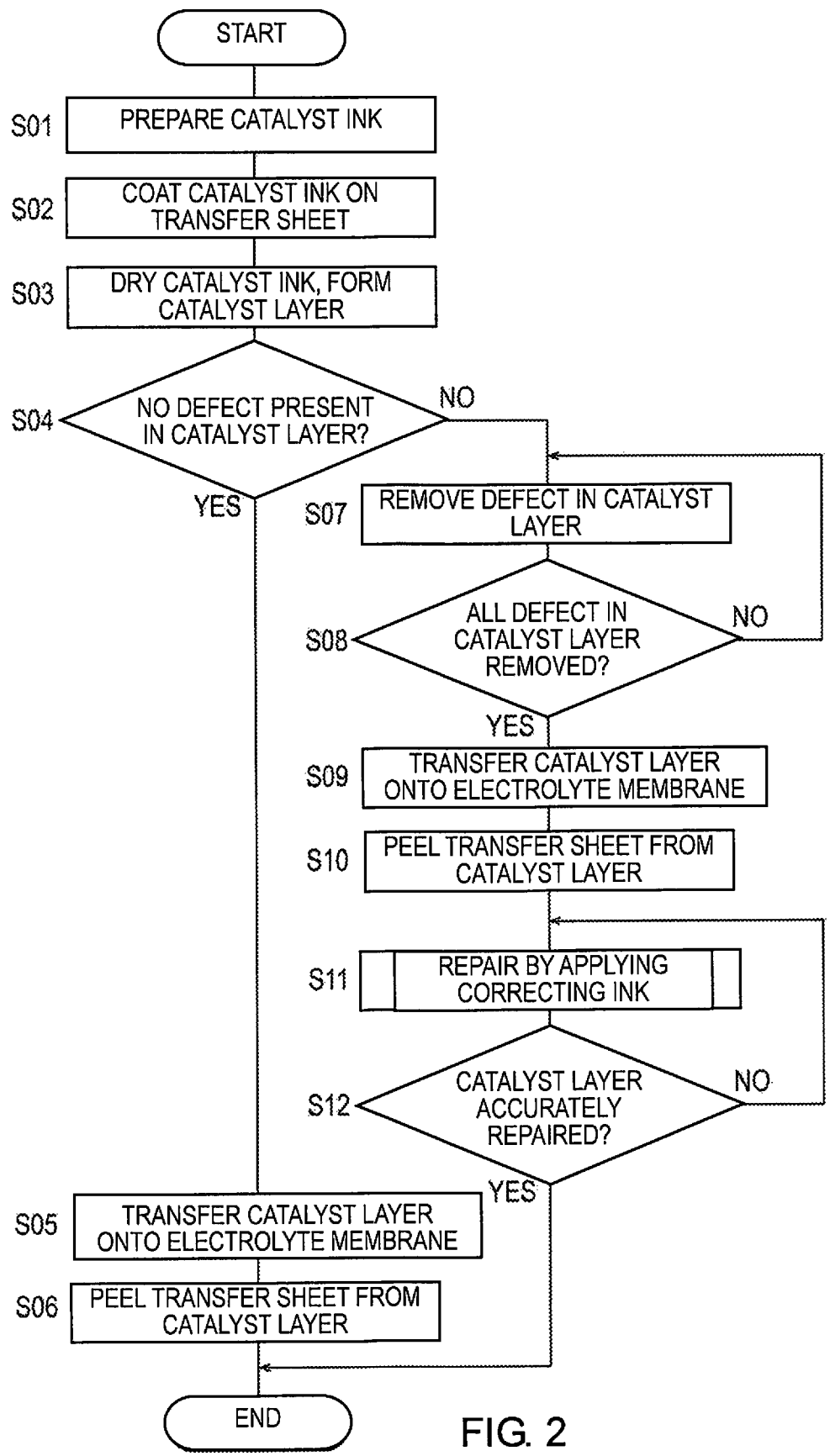
FIG. 2 is a flowchart illustrating a method of manufacturing a membrane catalyst layer assembly that incorporates the method for modifying a catalyst layer according to the present embodiment.
Figure 3:
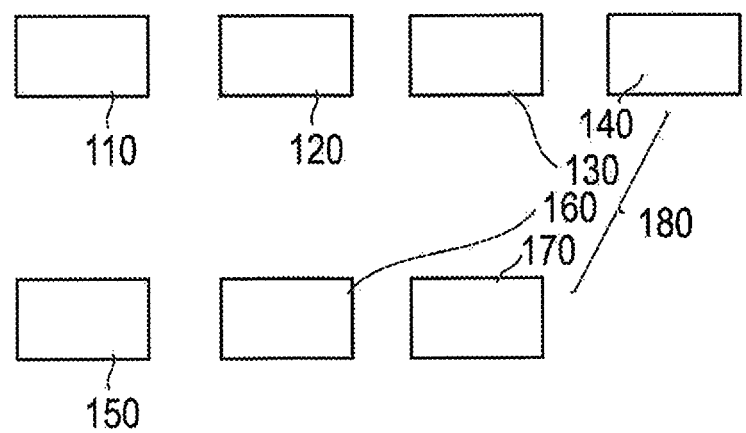
FIG. 3 is a diagram illustrating a device for manufacturing a membrane catalyst layer assembly that incorporates the catalyst layer correction device according to the present embodiment.

FIG. 1 is a flowchart illustrating the method for modifying a catalyst layer according to a first embodiment of the present invention. FIG. 2 is a flowchart illustrating a method of manufacturing a membrane catalyst layer assembly 40 that incorporates the method for modifying a catalyst layer according to the present embodiment. FIG. 3 is a diagram illustrating a device 100 for manufacturing a membrane catalyst layer assembly 40 that incorporates a catalyst layer correction device 180 for modifying a catalyst layer according to the present embodiment. In the description below, the anode side catalyst layer 221 and the cathode side catalyst layer 231 are collectively referred to as the catalyst layer 211.

In summary, the method for modifying a catalyst layer according to the present embodiment is a catalyst layer correction method that modifies a catalyst layer 211 of a membrane catalyst layer assembly 40, which is manufactured by transferring the catalyst layer 211 formed on a transfer sheet 50 onto an electrolyte membrane 21. In the method for modifying a catalyst layer, the presence or absence of a defect D in the catalyst layer 211 is detected (S101), and the defect D is removed based on the size and position of the detected defect D (S102), as illustrated in FIG. 1. The portion P1 from which the defect D has been removed is then repaired by application thereto of a correcting ink 211B corresponding to the catalyst layer 211 (S103).

In addition, in the method of manufacturing the membrane catalyst layer assembly 40 that incorporates the method for modifying a catalyst layer described above, after a catalyst ink 211A has dried and a catalyst layer 211 has been formed (S03), the presence or absence of a defect D is detected (S04), and the defect D is removed (S07), as illustrated in FIG. 2. The catalyst layer 211 is then transferred onto an electrolyte membrane 21 (S09) and the transfer sheet 50 is peeled off of the catalyst layer 211 (S10), after which the portion P1 from which the defect D has been removed is repaired by application thereto of a correcting ink 211B (S11).

Additionally, in summary, the device 180 for modifying a catalyst layer according to the present embodiment is a device 180 for modifying a catalyst layer that modifies a catalyst layer 211 of a membrane catalyst layer assembly 40, which is manufactured by transferring the catalyst layer 211 formed on a transfer sheet 50 onto an electrolyte membrane 21. The device 180 for modifying a catalyst layer comprises a detection unit 130 that detects the presence or absence of a defect D in the catalyst layer 211 and a removal unit 140 that removes the defect D based on the size and position of the defect D that is detected by the detection unit 130, as illustrated in FIG. 3. The device 180 for modifying a catalyst layer further comprises a repair unit 160 that repairs the portion P1 from which the defect D has been removed by the removal unit 140 by application thereto of a correcting ink 211B corresponding to the catalyst layer 211. The details are described below.

First, the device 100 for manufacturing a membrane catalyst layer assembly 40 that incorporates the device 180 for modifying a catalyst layer according to the present embodiment will be described with reference to FIG. 3.

The device 100 for manufacturing a membrane catalyst layer assembly 40 comprises a coating unit 110, a drying unit 120, a detection unit 130, a removal unit 140, a transfer unit 150, a repair unit 160, and an inspection unit 170, as illustrated in FIG. 3. The detection unit 130, the removal unit 140, the repair unit 160, and the inspection unit 170 constitute the device 180 for modifying a catalyst layer.

Next, the method of manufacturing a membrane catalyst layer assembly 40 will be described with reference to FIGS. 2 and 4-13.

First, a catalyst ink 211A is prepared in a preparation Step S01. The method of preparing the catalyst ink 211A is not particularly limited, as long as an electrode catalyst, an electrolyte, a solvent, and, if necessary, a water-repellent polymer and/or a thickener are appropriately mixed. For example, an electrolyte is added to a polar solvent, and the mixed solution is heated and stirred to dissolve the electrolyte membrane in the polar solvent, after which an electrode catalyst is added thereto, to prepare a catalyst ink 211A. Alternatively, an electrolyte membrane is temporarily dispersed/suspended in a solvent, after which said dispersion/suspension liquid is mixed with an electrode catalyst to prepare a catalyst ink 211A.

Figure 4:
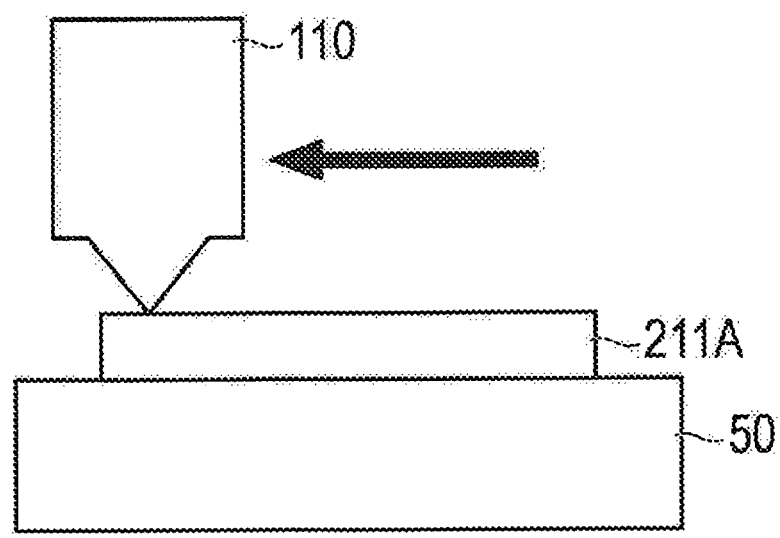
FIG. 4 is a diagram illustrating the coating step of the method of manufacturing the membrane catalyst layer assembly according to the present embodiment.

Next, in the coating Step S02, the catalyst ink 211A is coated on a transfer sheet 50 by a coating unit 110, as illustrated in FIG. 4. For example, a spray, a die coater, an inkjet, or the like may be used as the coating unit 110. Examples of the material that constitute the transfer sheet 50 include fluorine-based resins such as ETFE (ethylene tetrafluoroethylene copolymer) and PTFE (polytetrafluoroethylene), but no particular limitation is thereby imposed.

Figure 5:
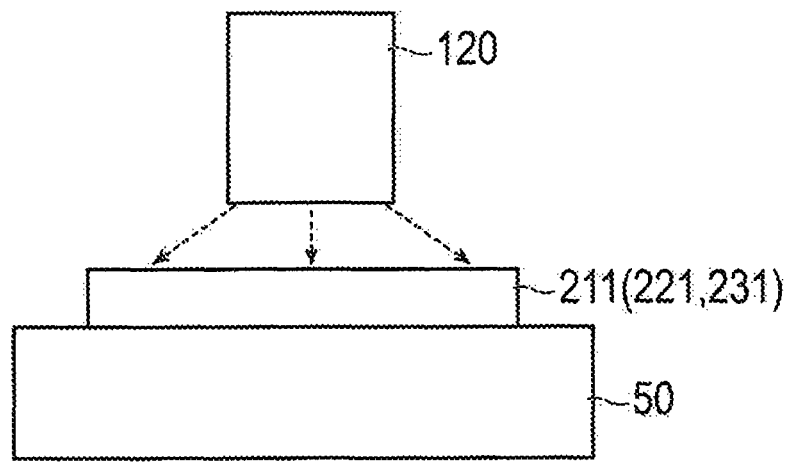
FIG. 5 is a diagram illustrating the drying step of the method of manufacturing the membrane catalyst layer assembly according to the present embodiment.

Next, in the drying Step S03, the catalyst ink 211A on the transfer sheet 50 is dried by a drying unit 120 to form a catalyst layer 211, as illustrated in FIG. 5. For example, a hot-air dryer, a hot plate, or the like may be used as the drying unit 120. At this time, a catalyst layer, in which an anode side catalyst layer 221 is formed on the transfer sheet 50, and a catalyst layer, in which a cathode side catalyst layer 231 is formed on the transfer sheet 50, are respectively formed.

Figure 6:
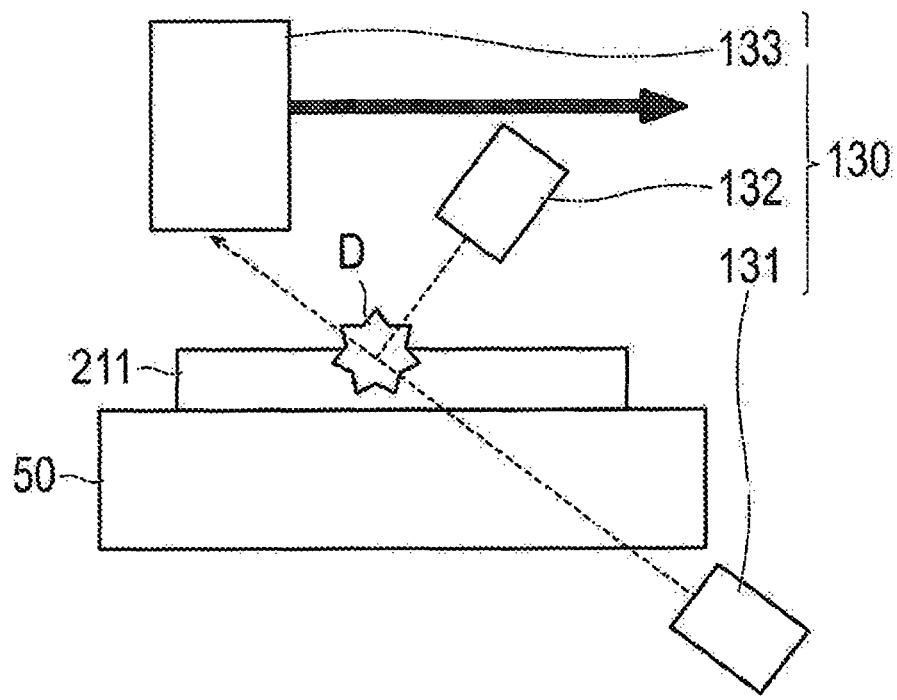
FIG. 6 is a diagram illustrating the detection step of the method of manufacturing the membrane catalyst layer assembly according to the present embodiment.

Next, in the detection Step S04, it is determined by the detection unit 130 whether or not a defect D is present in the catalyst layer 211, as illustrated in FIG. 6. The detection unit 130 detects the position and size of the defect D. The detection unit 130 comprises a transmissive light source 131, a reflected light source 132 and a camera 133. For example, an LED line illumination or area illumination may be used as the transmissive light source 131 and the reflected light source 132. For example, a CCD or CMOS area camera, or line camera may be used as the camera 133. The inspection resolution of the camera is, for example, 5-300 µm, but no particular limitation is thereby imposed.

Examples of defects D include pinholes, cracks, protruding/embedded contaminant foreign matter, and agglomerated foreign matter of the catalyst slurry. Pinholes and cracks are detected by the transmissive light source 131. Protruding/embedded contaminant foreign matter and agglomerated foreign matter of the catalyst slurry are detected by the reflected light source 132. The size of the defect D is, for example, about 50 µm to several mm.

If it is determined that a defect D is not present in the catalyst layer 211 in the detection Step S04 (S04: YES), the steps proceed to the transfer Step S05 in which the catalyst layer 211 is transferred onto the electrolyte membrane 21, and to the peeling Step S06 in which the transfer sheet 50 is peeled off of the catalyst layer 211. Since the transfer Step S05 and the peeling Step S06 are the same steps as the transfer Step S09 and the peeling Step S10 described below, detailed descriptions thereof will also be described below.

On the other hand, if it is determined that a defect D is present in the catalyst layer 211 in the detection Step S04 (S04: NO), the removal Step S07 and a removal confirmation Step S08 are carried out, after which the steps proceed to the transfer Step S09. The removal Step S07 and the removal confirmation Step S08 are described below.

Figure 7:
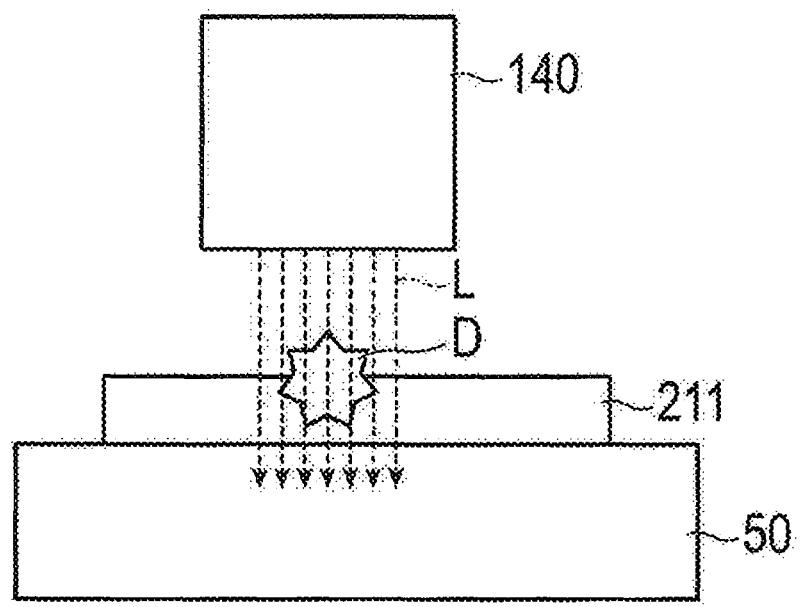
FIG. 7 is a diagram illustrating the removal step of the method of manufacturing the membrane catalyst layer assembly according to the present embodiment.

Next, the defect D in the catalyst layer 211 is removed by the removal unit 140 in the removal Step S07, as illustrated in FIG. 7. The removal unit 140 is a laser oscillation device equipped with a microscope function. In the removal Step S07, an irradiation position is determined by accurately recognizing the defect position with a microscopic image of the microscope function provided in the removal unit 140 based on the position information of the defect D obtained by the camera 133 to irradiate the laser light L. Accordingly, the laser light L is accurately irradiated on the defect D.

Figure 8A:
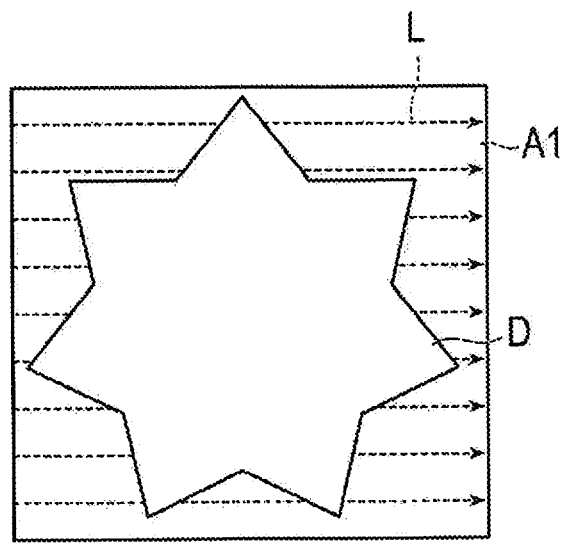
FIG. 8A is a diagram illustrating a state of irradiating continuous wave laser light L onto an area that is one size larger than the defect.
Figure 8B:
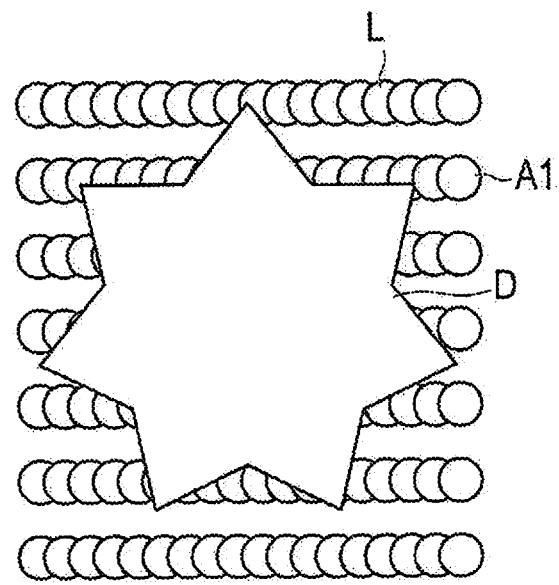
FIG. 8B is a diagram illustrating a state of irradiating pulsed laser light L onto an area that is one size larger than the defect.

The laser light L is irradiated on an area A1, which is one size larger than the defect D, by a scanner mirror, which is not shown, so as to remove the defect D and its surrounding catalyst layer 211, as illustrated in FIG. 7 and FIG. 8. The laser light L may be continuous wave light or a pulsed light. If the laser light L is continuous wave light, the laser light L is scanned continuously, as illustrated in FIG. 8A. If the laser light L is pulsed light, the laser light L is scanned intermittently, as illustrated in FIG. 8B.

In addition, the wavelength of the laser light L is, for example, 200 nm-1000 nm, but no particular limitation is thereby imposed. It is possible to heat/melt the defect D and the surrounding catalyst layer 211 or to expand the air in the catalyst layer 211 to blow off the defect D and the surrounding catalyst layer 211, due to the wavelength of the laser light L. The spot size of the laser light L can be appropriately changed by adjusting the installation location of the lens, which is not shown. In addition, it is possible to minimize the removal area by automatically determining the irradiation profile according to the size of the defect D. Additionally, it is preferable to appropriately set the energy of the laser light L according to the thickness of the catalyst layer 211. For example, since the cathode side catalyst layer 231 has a thicker film thickness than the anode side catalyst layer 221, it is preferable to set the energy of the laser light L higher.

Figure 9:
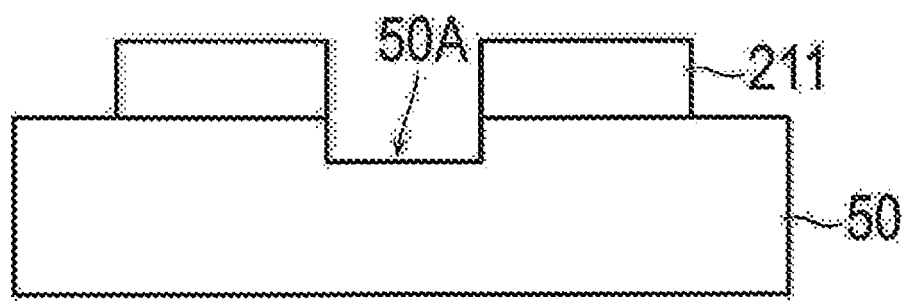
FIG. 9 is a diagram illustrating a catalyst layer and a transfer sheet after the removal step is terminated.

In addition, since the transfer sheet 50 is peeled off in the peeling Step S10 described below, the removal unit 140 can remove up to a surface 50A of the transfer sheet 50 on the side on which the catalyst layer 211 is formed, when removing the defect D, as illustrated in FIG. 9. Therefore, it is possible to remove up to the surface of the transfer sheet 50 by irradiating relatively high-energy laser light L, thereby improving the rate of production.

Next, the detection unit 130 determines whether or not the entire defect D in the catalyst layer 211 has been removed in the removal confirmation Step S08. The removal confirmation Step S08 may be carried out using the microscopic image of the microscope function of the removal unit 140 as well. If it is determined that the entire defect D has been removed (S08: YES), the steps proceed to the transfer Step S09.

On the other hand, if it is determined that part of the defect D still remains (S08: NO), the steps return to the removal Step S07. As an example, the removal Step S07 and the removal confirmation Step S08 of when a defect D, which is embedded contaminant foreign matter in which a base is formed, is disposed in the cat 211, will be described in detail below, with reference to FIG. 10A to 10C.

Figure 10A:
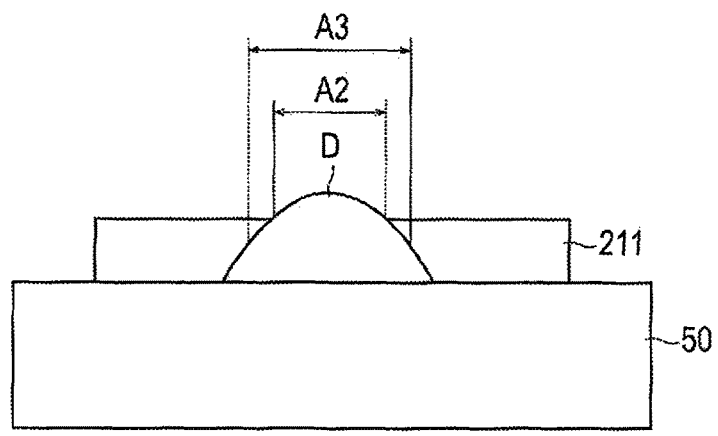
FIGS. 10A to 10C are a series of diagram illustrating a state in which a defect is again removed following removal of a defect in the catalyst layer.
Figure 10B:
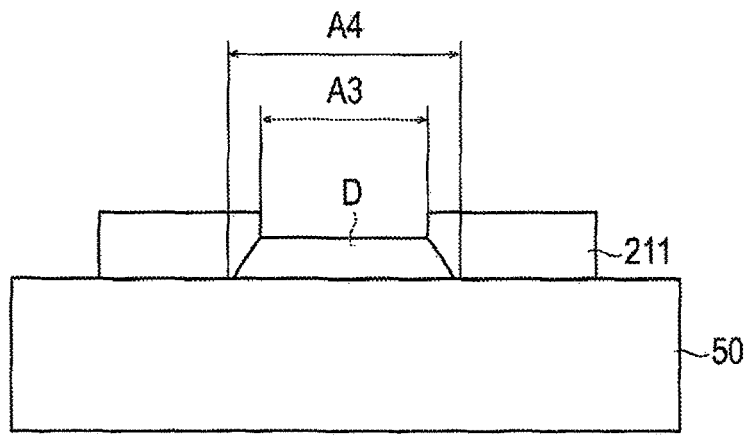
Figure 10C:
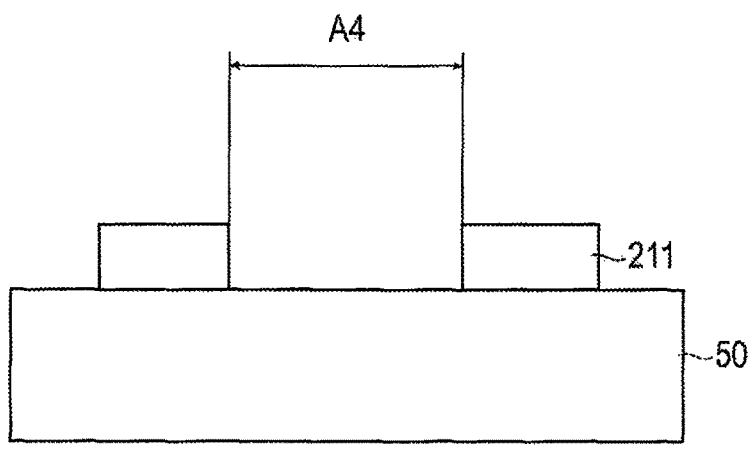

If an embedded defect D is disposed in the catalyst layer 211, the detection unit 130 detects an area A2 that protrudes from the catalyst layer 211, as illustrated in FIG. 10A. The removal unit 140 then irradiates laser light L on an area A3, which is one size larger than the area A2. At this time, the removal state is observed with the microscope function of the removal unit 140, while removal is gradually carried out until the defect D appears on the surface across the entire area A3 (S07). At this time, the defect D remains in the catalyst layer 211 (S08: NO), as illustrated in FIG. 10B. Accordingly, the steps return to the removal Step S07 again to remove the defect D. At this time, the laser light L is irradiated on an area A4, which is one size larger than the area A3. As a result, all of the defect D in the catalyst layer 211 can be removed, as illustrated in FIG. 10C. Next, the transfer Step S09 will be described.

Figure 11A:
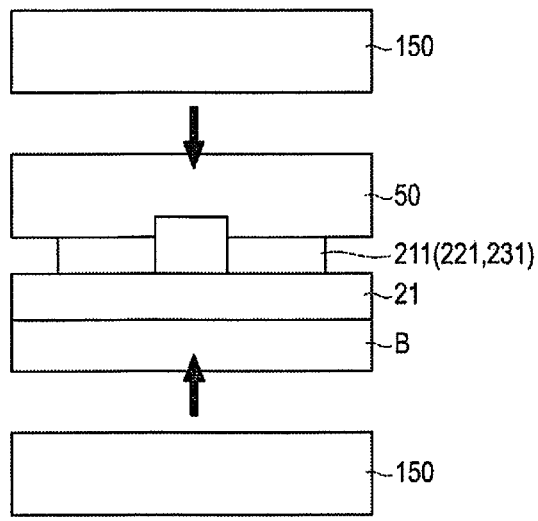
FIG. 11A is a diagram illustrating a single-sided transfer of the method of manufacturing a membrane catalyst layer assembly according to the present embodiment.
Figure 11B:
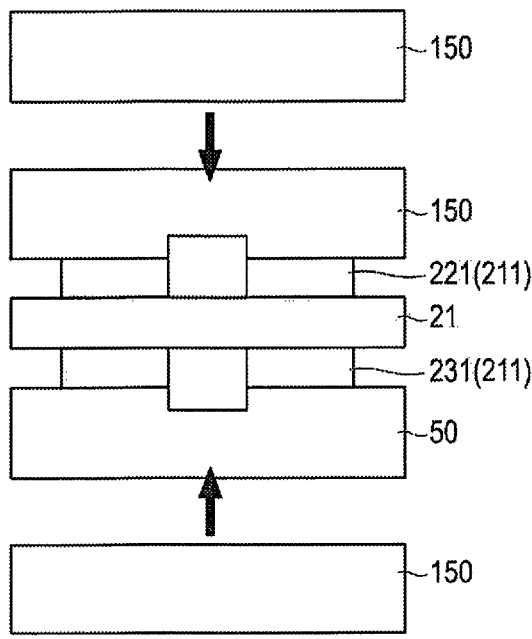
FIG. 11B is a diagram illustrating a double-sided transfer of the method of manufacturing a membrane catalyst layer assembly according to the present embodiment.

Next, the catalyst layer 211 is transferred to the electrolyte membrane 21 by the transfer unit 150 in the transfer Step S09 (S05), as illustrated in FIG. 11. The transfer unit 150 is, for example, a hot press device, and a roll press or a flat plate press may be used therefor. In the case of a single-sided transfer as illustrated in FIG. 11A, one of the anode side catalyst layer 221 and the cathode side catalyst layer 231 is transferred, after which a back sheet B is peeled off, then the other of the anode side catalyst layer 221 and the cathode side catalyst layer 231 is transferred. An anode side catalyst layer 221 and a cathode side catalyst layer 231 are thereby formed on the two sides of the electrolyte membrane 21. Additionally, in the case of a double-sided transfer as illustrated in FIG. 11B, an anode side catalyst layer 221 is transferred to one surface of the electrolyte membrane 21 and a cathode side catalyst layer 231 is transferred to the other surface at the same time.

Figure 12:
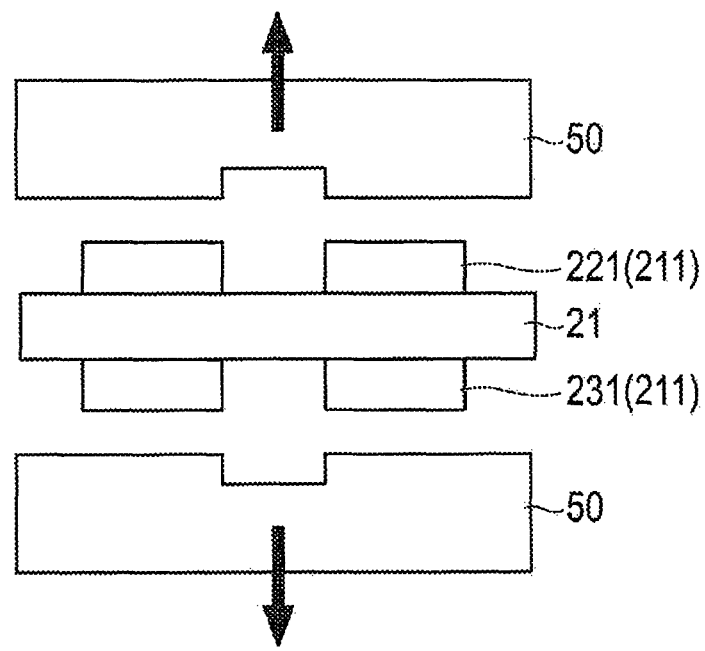
FIG. 12 is a diagram illustrating the peeling step of the method of manufacturing a membrane catalyst layer assembly according to the present embodiment.

Next, the transfer sheet 50 is peeled off of the catalyst layer 211 in the peeling Step S10 (S06), as illustrated in FIG. 12. If it has been determined that a defect D is not present in the catalyst layer 211 in the detection Step S04 (S04: YES), the manufacturing step is ended. On the other hand, if it has been determined that a defect D is present in the catalyst layer 211 in the detection Step S04 (S04: NO) and the removal Step S07 and the removal confirmation Step S08 have been carried out, the repair step S11 is carried out next.

Figure 13:
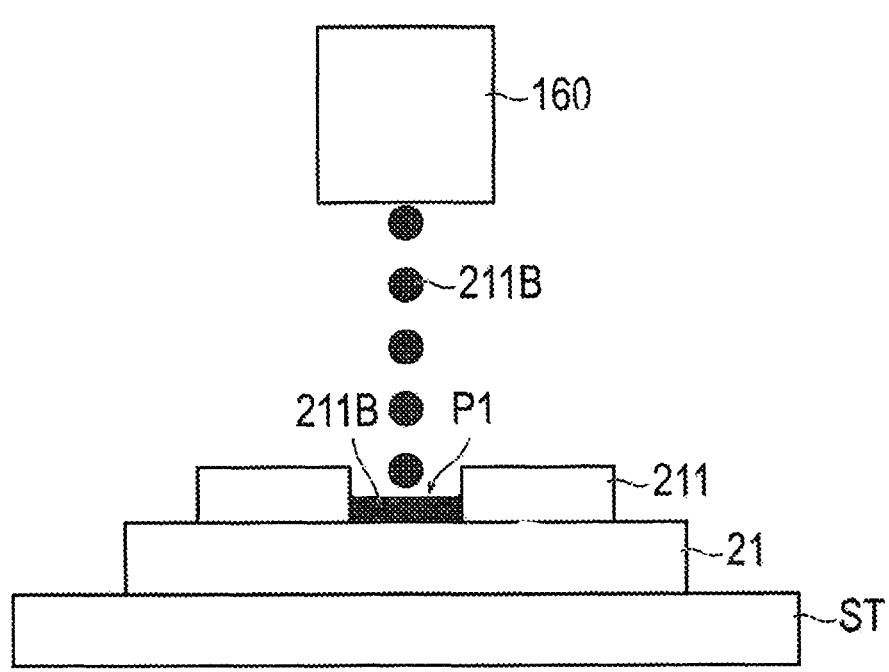
FIG. 13 is a diagram illustrating the repair step of the method of manufacturing a membrane catalyst layer assembly according to the present embodiment.

Next, the portion P1 from which the defect D has been removed is repaired by application thereto of a correcting ink 211B corresponding to the catalyst layer 211 with the repair unit 160 in the repair step S11, as illustrated in FIG. 13. FIGS. 13-18, 21-23, 26-28, and 30-32 are simplified views of states in which a catalyst layer 211 is formed on one side of the electrolyte membrane 21. The electrolyte membrane 21 is adsorbed and disposed on a suction stage ST. The correcting ink 211B has the same components as the catalyst ink 211A. The repair unit 160 applies the correcting ink 211B with the inkjet system. Examples of the inkjet system of the repair unit 160 according to the present embodiment include a piezo inkjet system, a continuous inkjet system, a static inkjet system, and a valve inkjet system. Details of the respective configurations and actions will be described below.

Figure 14:
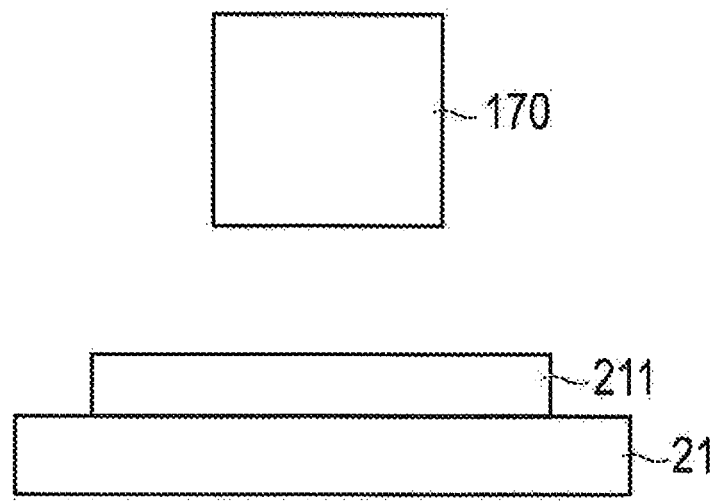
FIG. 14 is a diagram illustrating the inspection step of the method of manufacturing a membrane catalyst layer assembly according to the present embodiment.

Next, the inspection unit 170 inspects whether or not the catalyst layer 211 has been accurately repaired in the inspection Step S12, as illustrated in FIG. 14. The inspection unit 170 comprises a reflected light source and a camera. The inspection unit 170 may use the detection unit 130 or the microscope function of the removal unit 140. If it is determined that the catalyst layer 211 has been accurately repaired (S12: YES), the manufacturing process is terminated. On the other hand, if it is determined that the catalyst layer 211 has not been accurately repaired (S12: NO), the steps return to the repair step S11 and the correcting ink 211B is again coated.

With the steps described above, the membrane catalyst layer assembly 40 according to the present embodiment is manufactured.

The repair step S11 will be described in detail below. In the repair step S11, the repair unit 160 applies the correcting ink 211B with the inkjet system. Examples of the inkjet system include a piezo inkjet system, a continuous inkjet system, a static inkjet system, and a valve inkjet system. The configuration and the action of each system are described below.

Figure 15:
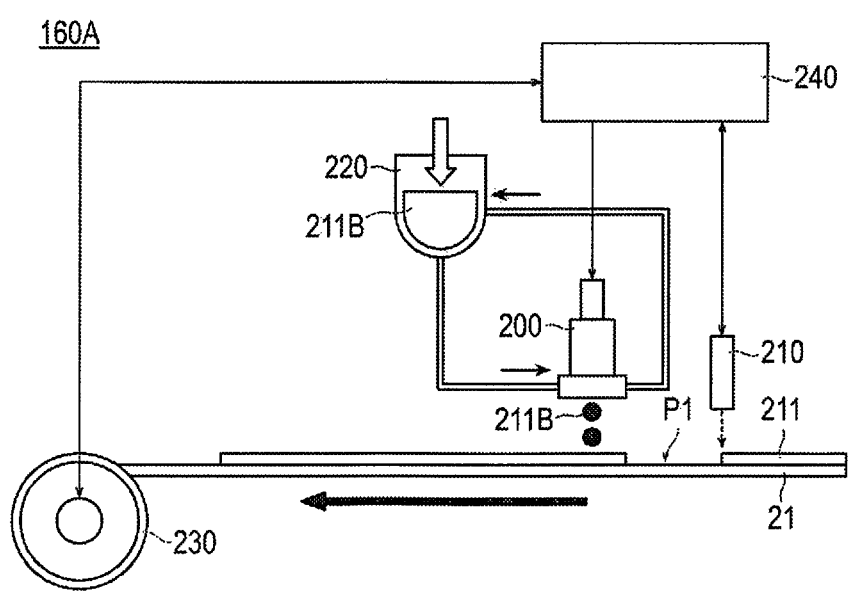
FIG. 15 is a diagram illustrating a repair unit of a piezo inkjet system.
Figure 16:
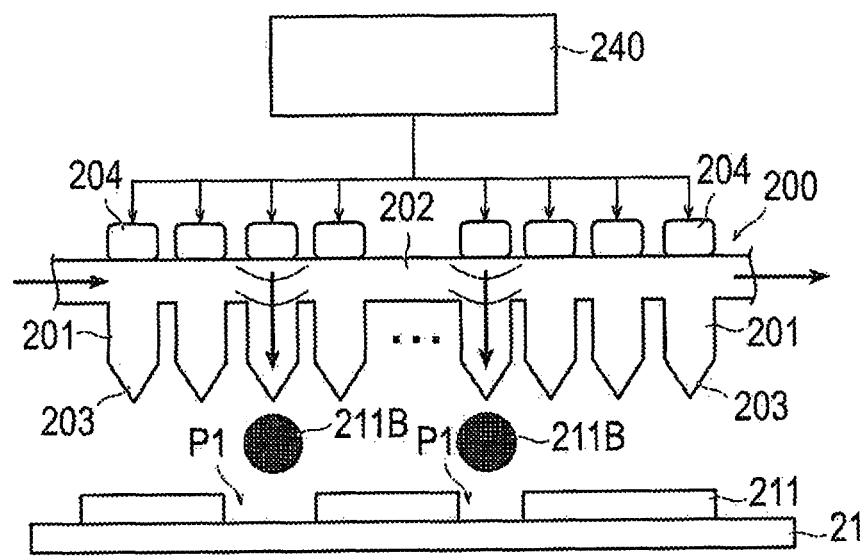
FIG. 16 is a diagram illustrating the principle of the piezo inkjet system.
Figure 17:
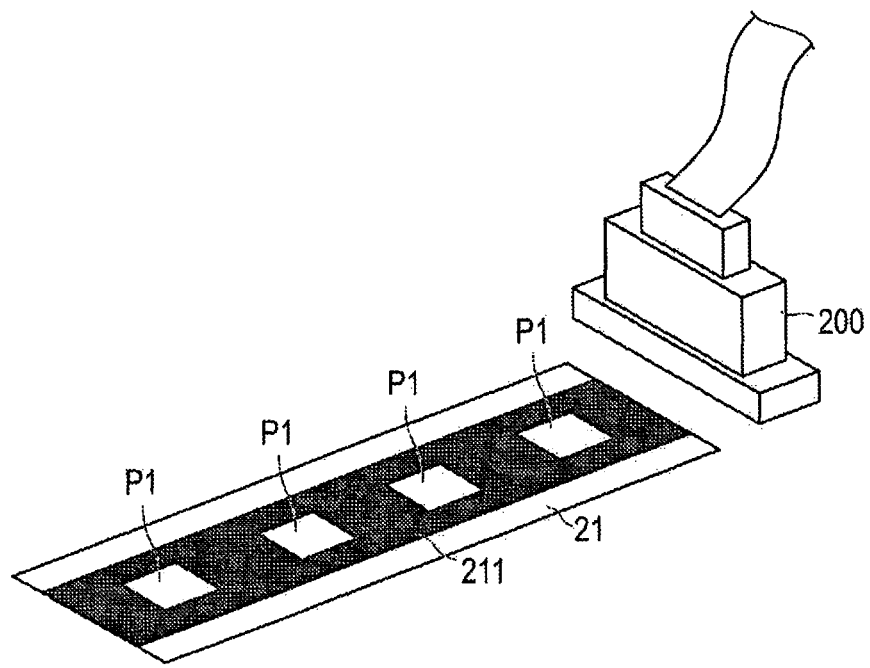
FIG. 17 is a diagram illustrating a case in which one coating unit of a piezo inkjet system is disposed.
Figure 18:
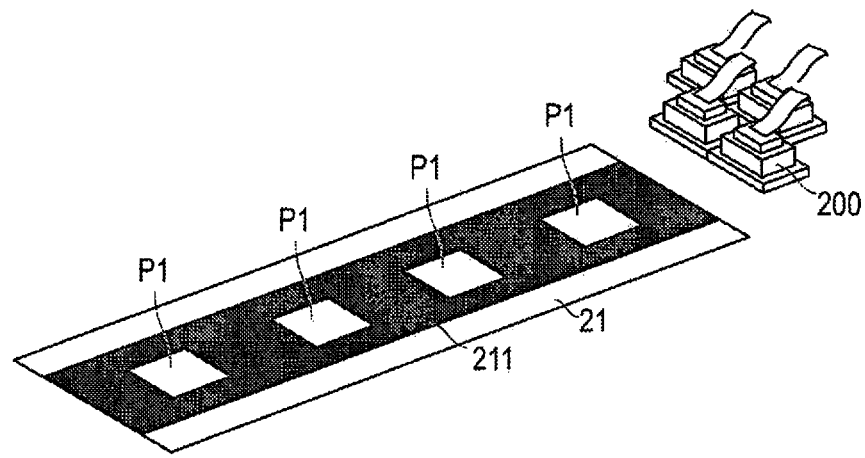
FIG. 18 is a diagram illustrating a case in which a plurality of coating units of a piezo inkjet system are disposed in a staggered pattern.
Figure 19:
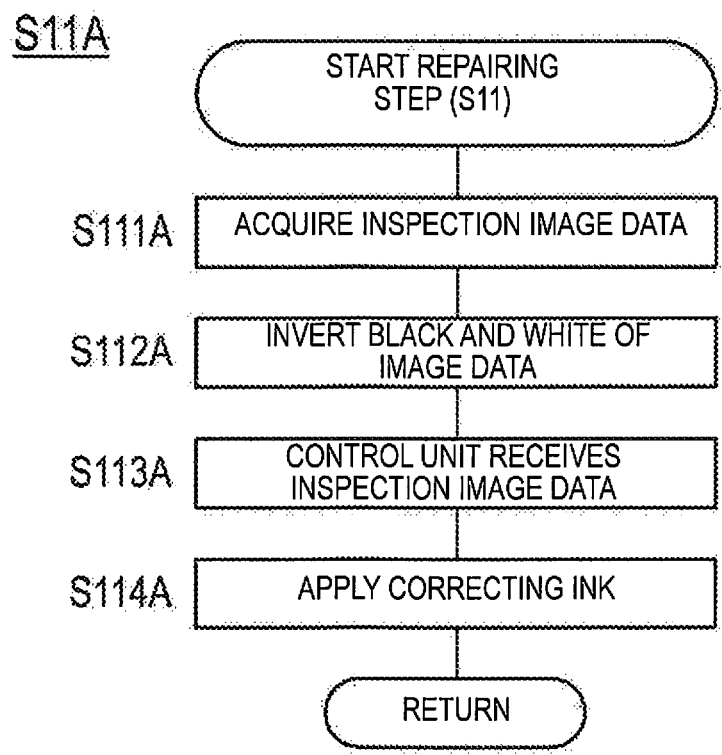
FIG. 19 is a flowchart of the repair step by the piezo inkjet system.
Figure 20:
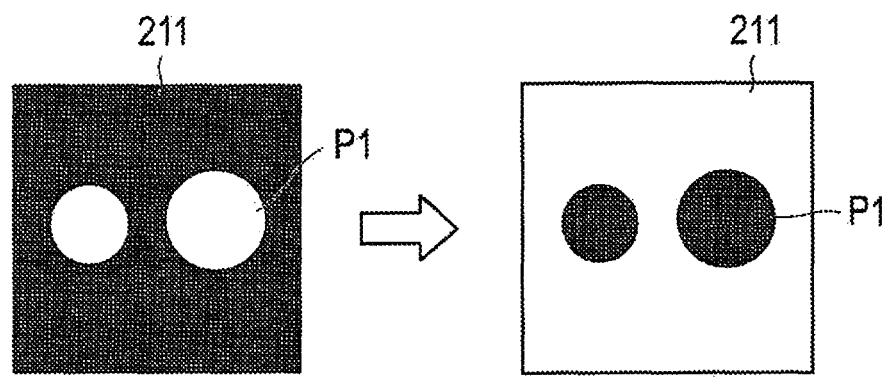
FIG. 20 is a schematic diagram illustrating inspection image data.

FIG. 15 is a diagram illustrating a repair unit 160A of a piezo inkjet system. FIG. 16 is a diagram illustrating the principle of the piezo inkjet system. FIG. 17 is a diagram illustrating a case in which one coating unit 200 of a piezo inkjet system is disposed. FIG. 18 is a diagram illustrating a case in which a plurality of coating units 200 of a piezo inkjet system are disposed in a staggered pattern. FIG. 19 is a flowchart of the repair step S11A by the piezo inkjet system. FIG. 20 is a schematic diagram illustrating inspection image data PD.

The repair unit 160A of the piezo inkjet system comprises a coating unit 200, a catalyst layer sensor 210, a correcting ink tank 220, a take-up roller 230, and a control unit 240, as illustrated in FIG. 15.

The coating unit 200 of the piezo inkjet system applies the correcting ink 211B on the portion P1 from which the defect D has been removed by the removal unit 140. The coating unit 200 comprises a head 201, an ink chamber 202, a nozzle 203, and piezo elements 204, as illustrated in FIG. 16.

In a piezo inkjet system, voltage is applied to the piezo elements 204 from the control unit 240. As a result, the piezo elements 204 are deformed, and the correcting ink 211B in the ink chamber 202 is discharged from the nozzle 203 to the outside of the head 201. The droplet amount of the correcting ink 211B is controlled by the number of times that voltage is applied to the piezo elements 204, and by the magnitude of the voltage. One coating unit 200 may be provided, as illustrated in FIG. 17, or a plurality thereof may be provided, as illustrated in FIG. 18. If one coating unit 200 is provided, as illustrated in FIG. 17, the coating unit is preferably configured to be movable in the width direction by a servo-slider or the like. In addition, if a plurality of coating units 200 are provided, as illustrated in FIG. 18, the coating units are preferably arranged in a staggered pattern. Arrangement in a staggered pattern makes it possible to apply the correcting ink 211B more densely in the width direction. The number of nozzles 203 per head 201 is, for example, 128 to 512, but no particular limitation is thereby imposed.

The catalyst layer sensor 210 detects the portion P1 of the electrolyte membrane 21 from which the defect D has been removed. The catalyst layer sensor 210 comprises a reflected light source and a camera. The catalyst layer sensor 210 may use the detection unit 130 or the microscope function of the removal unit 140.

The correcting ink 211B is stored in the correcting ink tank 220, and the correcting ink 211B is supplied under pressure to the ink chamber 202 of the coating unit 200 by a pressurizing unit, which is not shown. The correcting ink 211B that is not discharged in the ink chamber 202 is returned to the correcting ink tank 220.

The take-up roller 230 winds up the membrane catalyst layer assembly 40 in which the correcting ink 211B has been coated on the electrolyte membrane 21.

The control unit 240 comprises a ROM, a CPU, and a RAM. The control unit 240 controls various operations of the piezo elements 204, the catalyst layer sensor 210, and the take-up roller 230.

The repair step S11A by the piezo inkjet system will now be described with reference to FIG. 19.

First, inspection image data PD is acquired by the catalyst layer sensor 210 (S111A) At this time, the portion P1 from which the defect D has been removed is acquired as a white image, and the catalyst layer 211 is acquired as a black image, as illustrated on the left side of FIG. 20.

Next, the black and white of the inspection image data PD acquired by the catalyst layer sensor 210 are inverted (S112A). At this time, the portion P1 from which the defect D has been removed is inverted to a black image, and the catalyst layer 211 is inverted to a white image, as illustrated on the right side of FIG. 20.

Next, the inspection image data PD in which black and white have been inverted in S112A is received by the control unit 240 (S113A).

Next, the coating unit 200 applies the correcting ink 211B to the portion P1 from which the defect D has been removed (S114A). Specifically, the correcting ink 211B is supplied to the ink chamber 202 while a signal is sent to the piezo elements 204 to deform the piezo element 204 and apply the correcting ink 211B. Of the plurality of piezo elements 204, only the piezo elements 204 that correspond to the location to be repaired are driven by application of a voltage thereto to discharge the correcting ink 211B. That is, the correcting ink 211B is applied to the black portion of the inspection image data PD received by the control unit 240 in S113A.

The membrane catalyst layer assembly 40 is manufactured with the steps described above.

When the inkjet system of the coating unit 200 is a piezo inkjet system as described above, positioning can be accurately carried out by numerous piezo elements 204; therefore, the portion P1 from which the defect D has been removed can be more accurately repaired. In addition, since droplets can be reduced in size with a piezo inkjet system, it is possible to improve the accuracy of the shape of the catalyst layer 211 that is formed by the correcting ink 211B.

Figure 21:
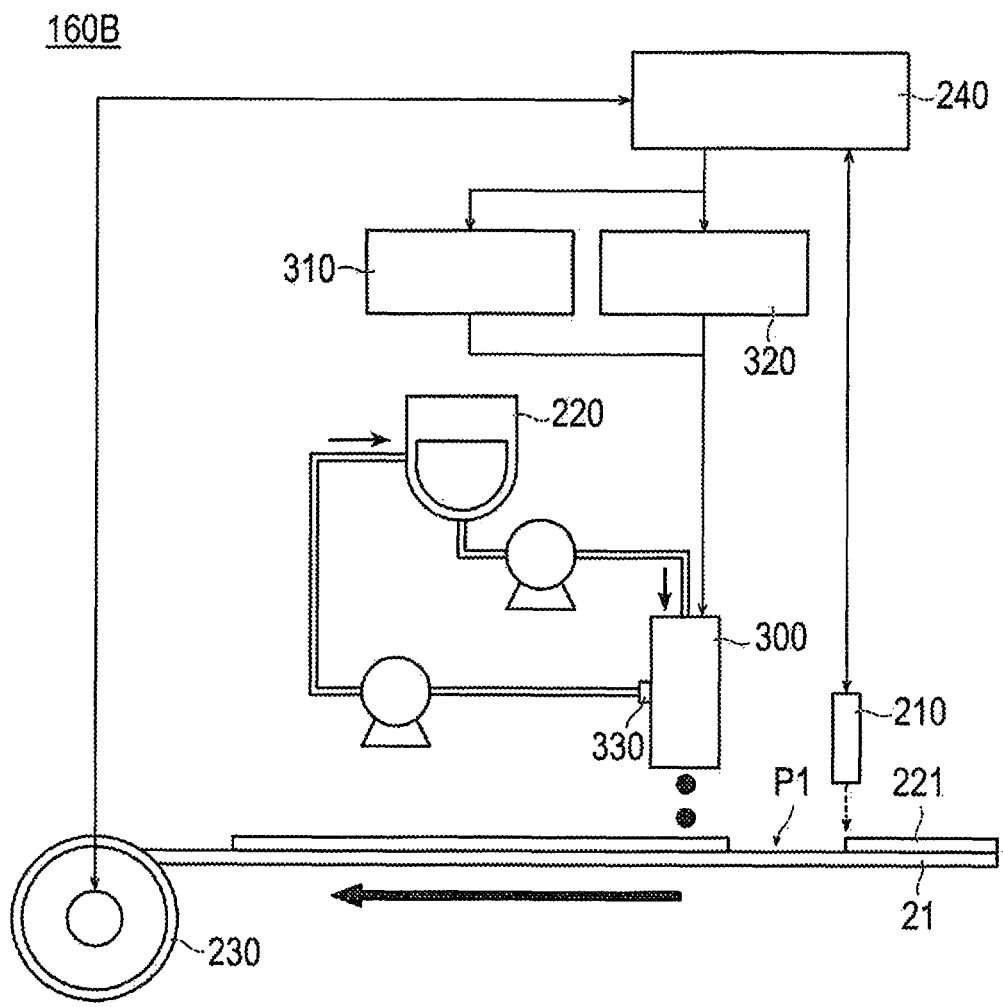
FIG. 21 is a diagram illustrating a repair unit of a continuous inkjet system.
Figure 22:
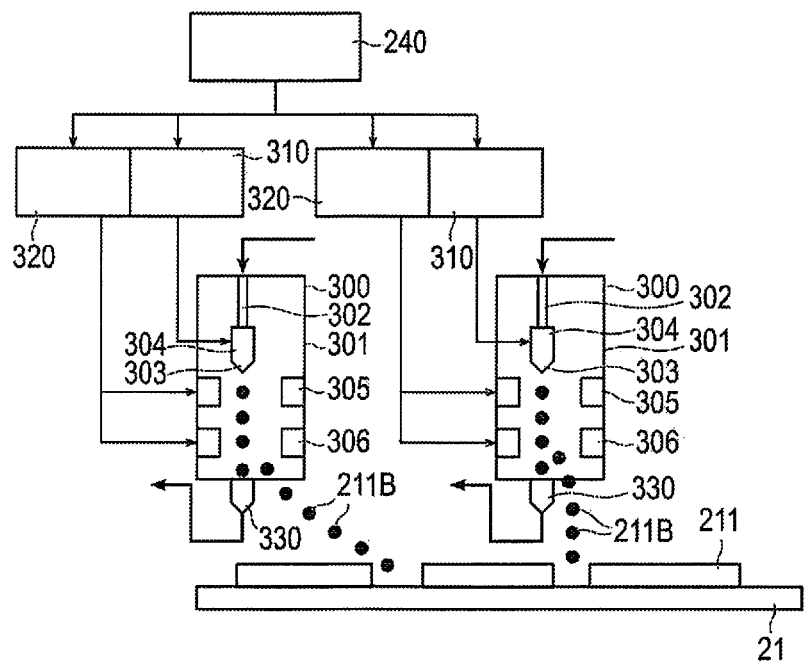
FIG. 22 is a diagram illustrating the principle of the continuous inkjet system.
Figure 23:
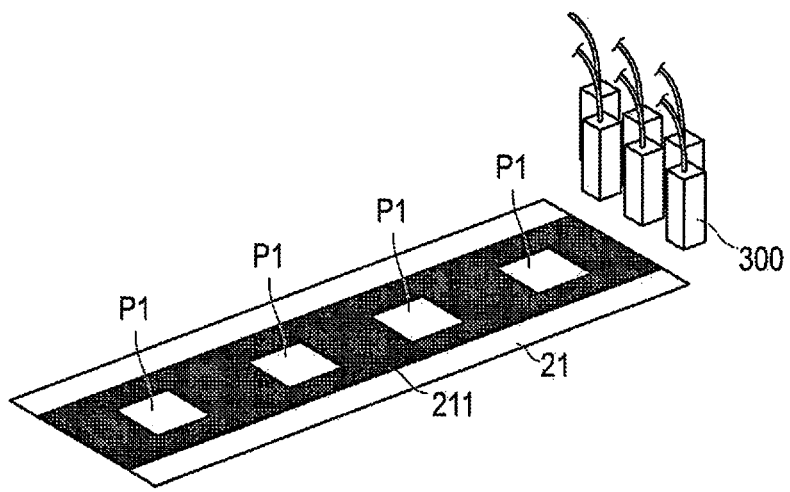
FIG. 23 is a diagram illustrating a state in which a plurality of coating units of a continuous inkjet system are disposed in a staggered pattern.
Figure 24:
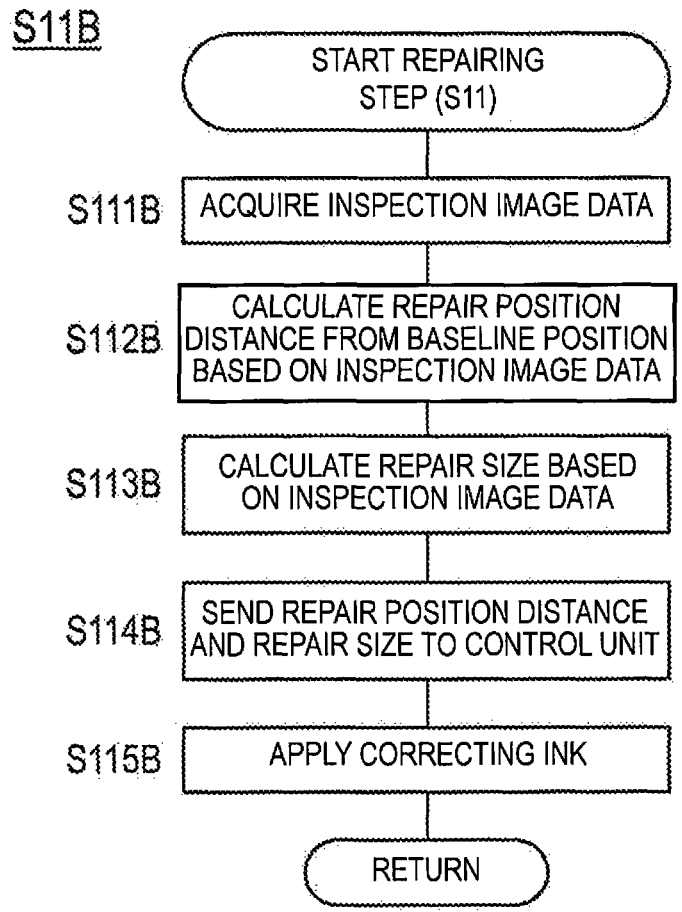
FIG. 24 is a flowchart of the repair step by the continuous inkjet system.
Figure 25:
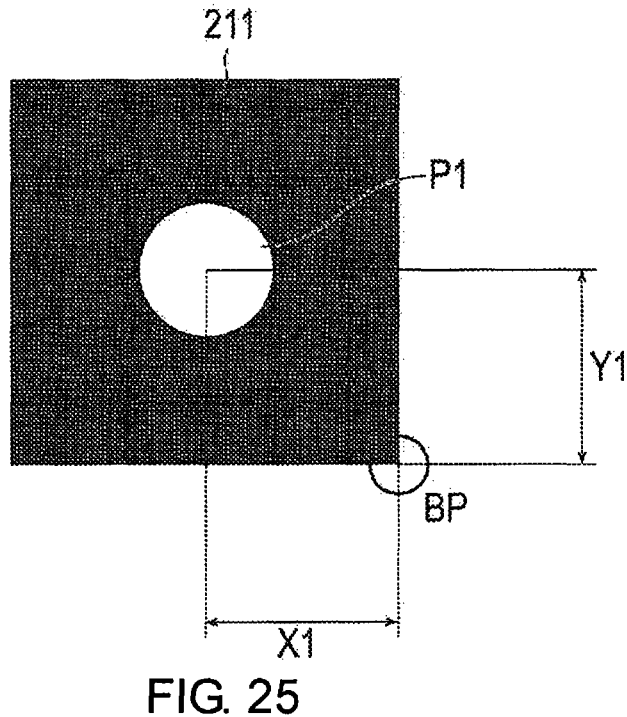
FIG. 25 is a schematic diagram illustrating inspection image data.

FIG. 21 is a diagram illustrating a repair unit 160B of a continuous inkjet system. FIG. 22 is a diagram illustrating the principle of the continuous inkjet system. FIG. 23 is a diagram illustrating a state in which a plurality of coating units 300 of a continuous inkjet system are disposed in a staggered pattern. FIG. 24 is a flowchart of the repair step S11B by the continuous inkjet system. FIG. 25 is a schematic diagram illustrating inspection image data PD.

The repair unit 160B of the continuous inkjet system comprises a coating unit 300, a catalyst layer sensor 210, a correcting ink tank 220, a take-up roller 230, and a control unit 240, as illustrated in FIG. 21. The repair unit 160B further comprises an ultrasonic wave generator 310, a voltage supply unit 320, and a correcting ink collection unit 330. Since the configurations of the catalyst layer sensor 210, the correcting ink tank 220, the take-up roller 230, and the control unit 240 are the same as in the repair unit 160A of the piezo inkjet system, the descriptions are omitted.

The coating unit 300 applies the correcting ink 211B on the portion P1 from which the defect D has been removed by the continuous inkjet system. The coating unit 300 comprises a head 301, an ink chamber 302, a nozzle 303, an excitation source 304, a charging electrode 305, and a deflection electrode 306, as illustrated in FIG. 22. A plurality of the coating units 300 are arranged in a staggered pattern, as illustrated in FIG. 23. The number of nozzles 303 per head 301 is one or a plurality.

In a continuous inkjet system, first, correcting ink 211B is ejected from the nozzle 303 by a pump, which is not shown, and the correcting ink 211B is formed into a liquid column. Then, the excitation source 304 is excited by the ultrasonic wave generator 310. As a result, the vibration in the ink chamber 302 is transmitted to the correcting ink 211B, which has been formed into a liquid column, generating constrictions in the liquid column, which break to become liquid droplets. Then, the charging electrode 305 charges the droplets of the correcting ink 211B. Then, as a result of the deflection electrode 306 providing an applied voltage corresponding to the target moving distance with respect to the charged droplets of the correcting ink 211B, the droplets land on the portion P1 from which the defect D has been removed. In FIG. 22, the deflection electrode 306 of the coating unit 300 on the left side provides an applied voltage that is larger than that of the deflection electrode 306 of the coating unit 300 on the right side. As a result, the correcting ink 211B that is discharged from the coating unit 300 on the left side moves considerably in the right direction.

The droplet amount of the correcting ink 211B is controlled by the number of times that the deflection electrode 306 provides an applied voltage to the droplets. Additionally, in the deflection electrode 306, the droplets that are not provided an application electrode are collected by the correcting ink collection unit 330 and returned to the correcting ink tank 220.

Next, the repair step S1B by the continuous inkjet system will be described with reference to FIG. 24.

First, inspection image data PD is acquired by the catalyst layer sensor 210 (S111B) At this time, the portion P1 from which the defect D has been removed is acquired as a white image, and the catalyst layer 211 is acquired as a black image, as illustrated in FIG. 25.

Next, the repair position distance from a baseline position BP is calculated based on the inspection image data PD (S112B). Specifically, the lateral direction component distance X1 and the vertical direction component distance Y1 from the baseline position BP are calculated, as illustrated in FIG. 25.

Next, the repair size is calculated based on the inspection image data PD (S113B). Specifically, the volume at the portion P1 from which the defect D has been removed is calculated.

Next, the repair size and the repair position distance from the baseline position BP are transmitted to the control unit 240 (S114B).

Next, the coating unit 300 applies the correcting ink 211B to the portion P1 from which the defect D has been removed (S115B). Specifically, the charging electrode 305 charges the droplets, and the deflection electrode 306 provides an applied voltage to predetermined droplets, and the droplets land on the portion P1 from which the defect D has been removed.

The membrane catalyst layer assembly 40 is manufactured with the steps described above. The correcting ink 211B may be applied by the same procedure as the coating Step S11A of the piezo inkjet system as well.

As described above, if the inkjet system is a continuous inkjet system, the correcting ink 211B is circulated, and it is possible to prevent clogging of the nozzle 303.

Figure 26:
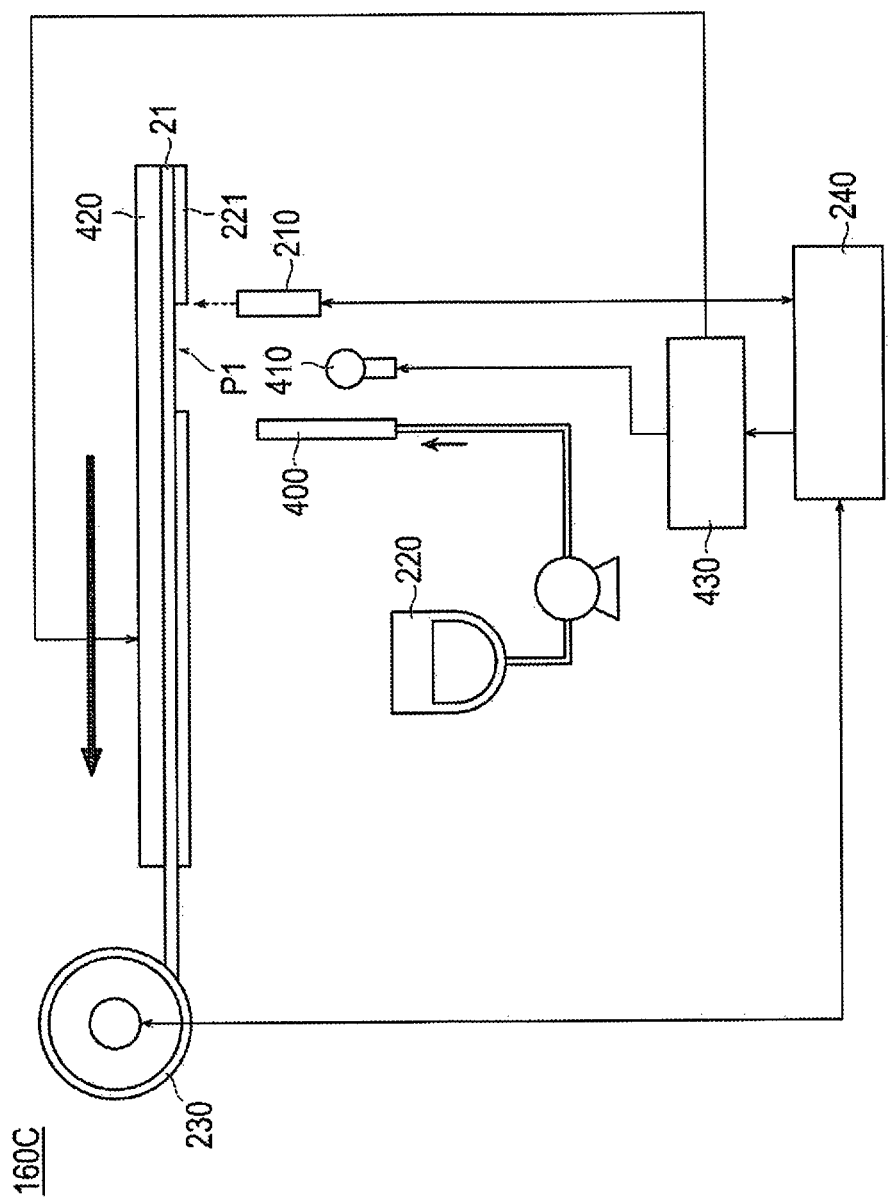
FIG. 26 is a diagram illustrating a repair unit of an electrostatic inkjet system.
Figure 27:
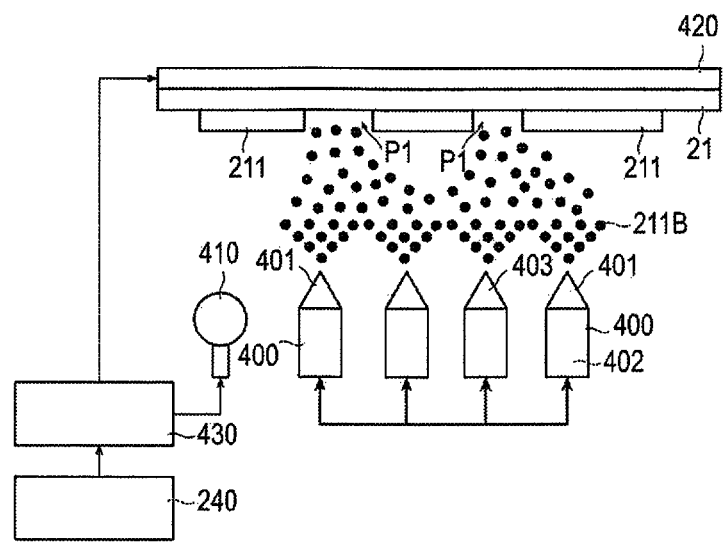
FIG. 27 is a diagram illustrating the principle of the electrostatic inkjet system.
Figure 28:
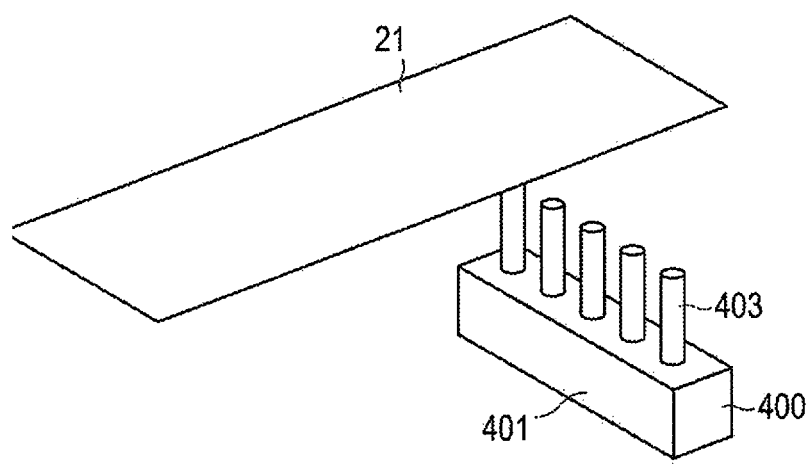
FIG. 28 is a diagram illustrating the coating unit of the electrostatic inkjet system.
Figure 29:
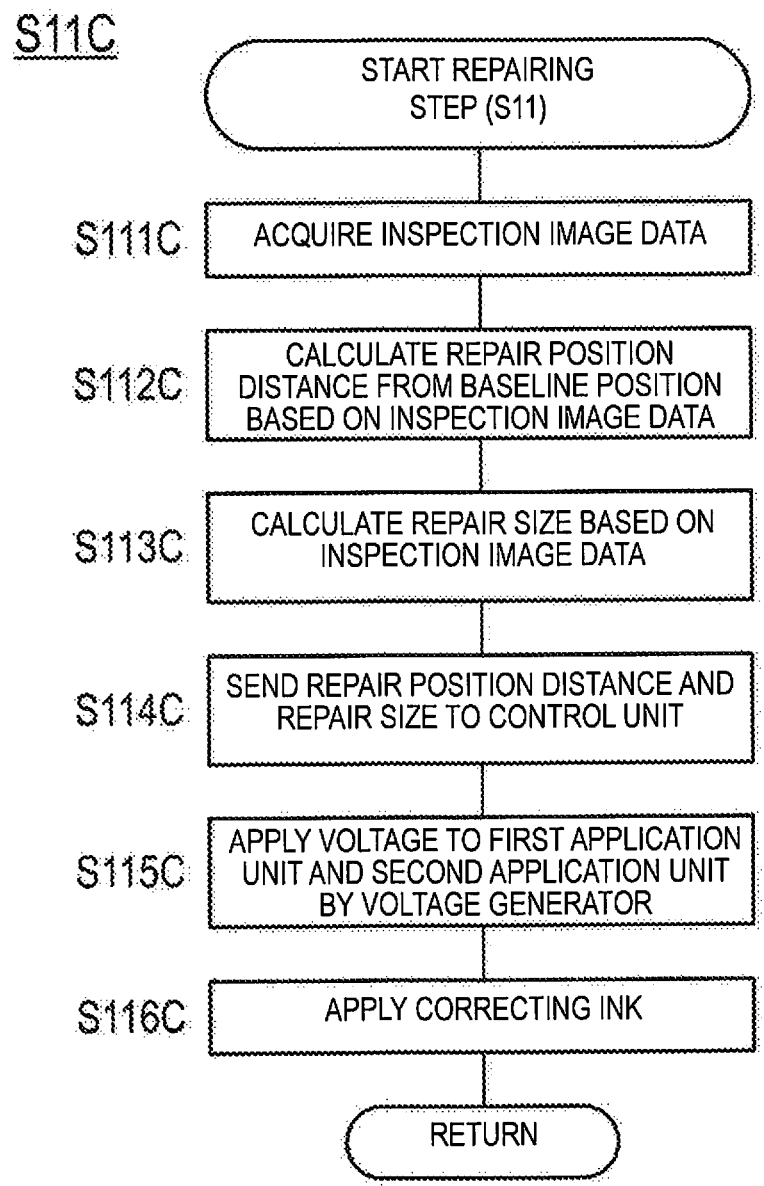
FIG. 29 is a flowchart of the repair step by the electrostatic inkjet system.

FIG. 26 is a diagram illustrating a repair unit 160C of an electrostatic inkjet system. FIG. 27 is a diagram illustrating the principle of the electrostatic inkjet system. FIG. 28 is a diagram illustrating the coating unit 400 of the electrostatic inkjet system. FIG. 29 is a flowchart of the repair step S1 IC by the electrostatic inkjet system.

The repair unit 160C of the electrostatic inkjet system comprises a coating unit 400, a catalyst layer sensor 210, a correcting ink tank 220, a take-up roller 230, and a control unit 240, as illustrated in FIG. 26. The repair unit 160C further comprises a first application unit 410, a second application unit 420, and a voltage generator 430. Since the configurations of the catalyst layer sensor 210, the correcting ink tank 220, the take-up roller 230, and the control unit 240 are the same as in the repair unit 160A of the piezo inkjet system, the descriptions are omitted.

The coating unit 400 applies the correcting ink 211B to the portion P1 from which the defect D has been removed by the electrostatic inkjet system. The coating unit 400 comprises a head 401, an ink chamber 402, and a nozzle 403, as illustrated in FIG. 27. The nozzle 403 is a syringe nozzle, such as a syringe needle, as illustrated in FIG. 28. The number of nozzles 403 per head 401 is, for example, five, but no particular limitation is thereby imposed.

The first application unit 410 is disposed in the vicinity of the coating unit 400, as illustrated in FIG. 26. The first application unit 410 is negatively charged by the voltage generator 430.

The second application unit 420 is disposed on a surface of the electrolyte membrane 21 on the opposite side of the surface on which the catalyst layer 211 is formed, as illustrated in FIG. 26. The second application unit 420 is negatively charged by the voltage generator 430.

In an electrostatic inkjet system, first, the head 401 of the coating unit 400 is positively charged by the first application unit 410, which is negatively charged by the voltage generator 430. As a result, the correcting ink 211B that is discharged from the coating unit 400 is positively charged. Here, compared to the location where the catalyst layer 211 is formed, the portion P1 from which the defect D has been removed is thinner in the vertical direction in FIG. 27, and thus has lower electrical resistance. Therefore, since the negative electric field is intensified at the portion P1 from which the defect D has been removed, the positively charged correcting ink 211B automatically lands on the portion P1 from which the defect D has been removed. The droplet amount of the correcting ink 211B is controlled by the magnitude of the voltage that is applied to the first application unit 410 and the second application unit 420.

Next, the repair step S11C by the electrostatic inkjet system will be described with reference to FIG. 29. Compared to the repair step S11B by the continuous inkjet system, the repair step S11C by the electrostatic inkjet system is different in the steps after the step for transmitting the repair position distance and the repair size to the control unit 240 (S114C). Therefore, the steps following Step S114C will be described below.

The voltage generator 430 applies voltage to the first application unit 410 and the second application unit 420 (S115C). Specifically, the first application unit 410 and the second application unit 420 are negatively charged. Thus, the head 401 of the coating unit 400 is positively charged and the correcting ink 211B that is discharged from the coating unit 400 is positively charged.

Next, the coating unit 400 applies the correcting ink 211B on the portion P1 from which the defect D has been removed. At this time, since the correcting ink 211B is positively charged and the negative electric field of the portion P1 from which the defect D has been removed is stronger than the portion in which the catalyst layer 211 is formed, the correcting ink 211B automatically lands on the portion P1 from which the defect D has been removed.

The membrane catalyst layer assembly 40 is manufactured with the steps described above. The correcting ink 211B may be applied with the same procedure as the coating Step S11A of the piezo inkjet system as well.

As described above, if the inkjet system is an electrostatic inkjet system, the correcting ink 211B automatically lands on the portion P1 from which the defect D has been removed without controlling the discharge direction; therefore, the repair step S11C is easily carried out.

Figure 30:
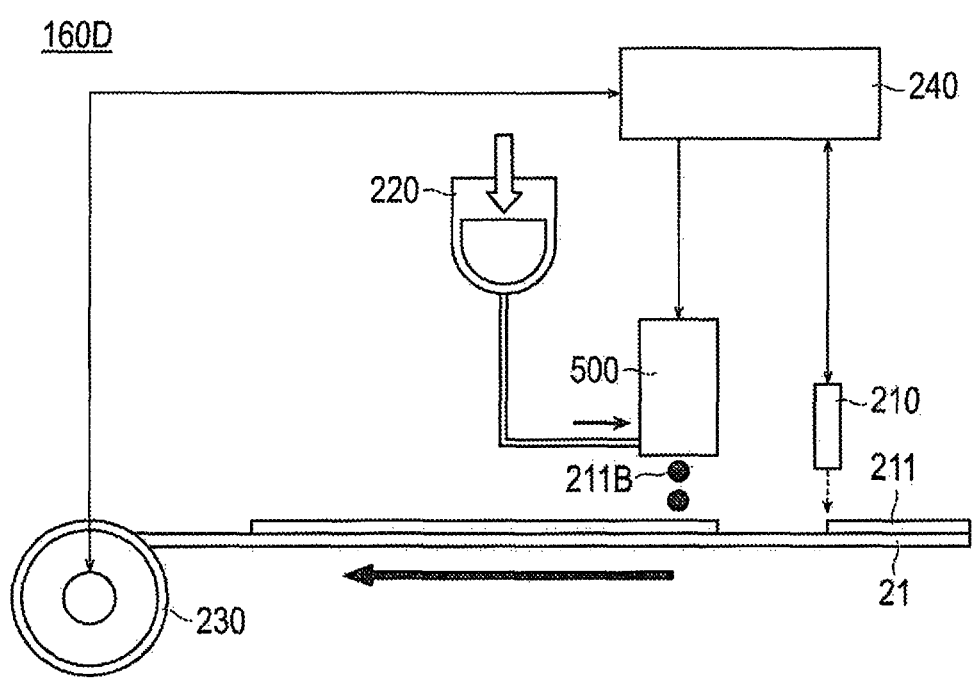
FIG. 30 is a diagram illustrating the repair unit by a valve inkjet system.
Figure 31:
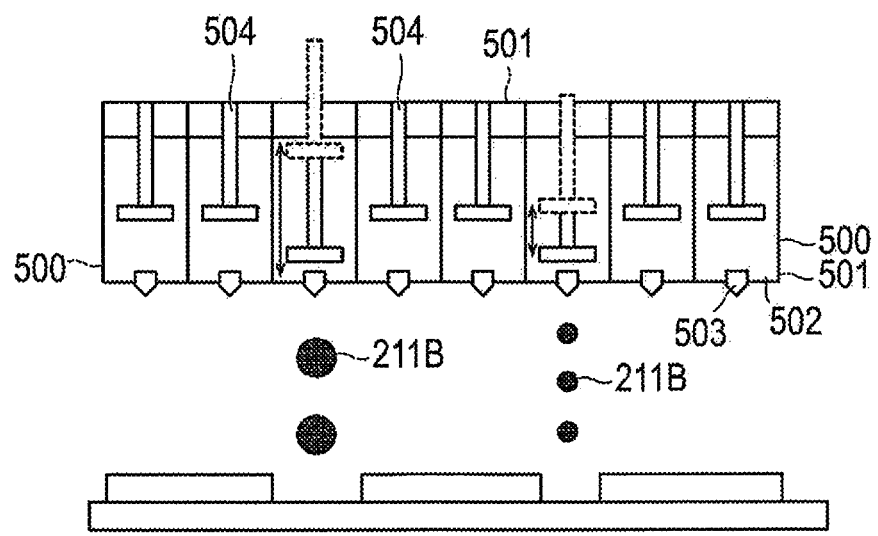
FIG. 31 is a diagram illustrating the principle of the valve inkjet system.
Figure 32:
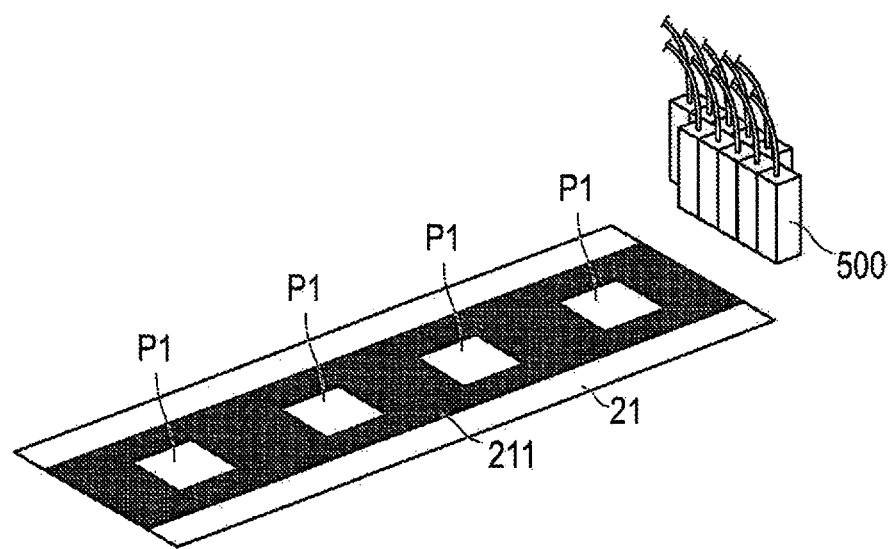
FIG. 32 is a diagram illustrating a state in which a plurality of coating units of the valve inkjet system are disposed in a staggered pattern.
Figure 33:
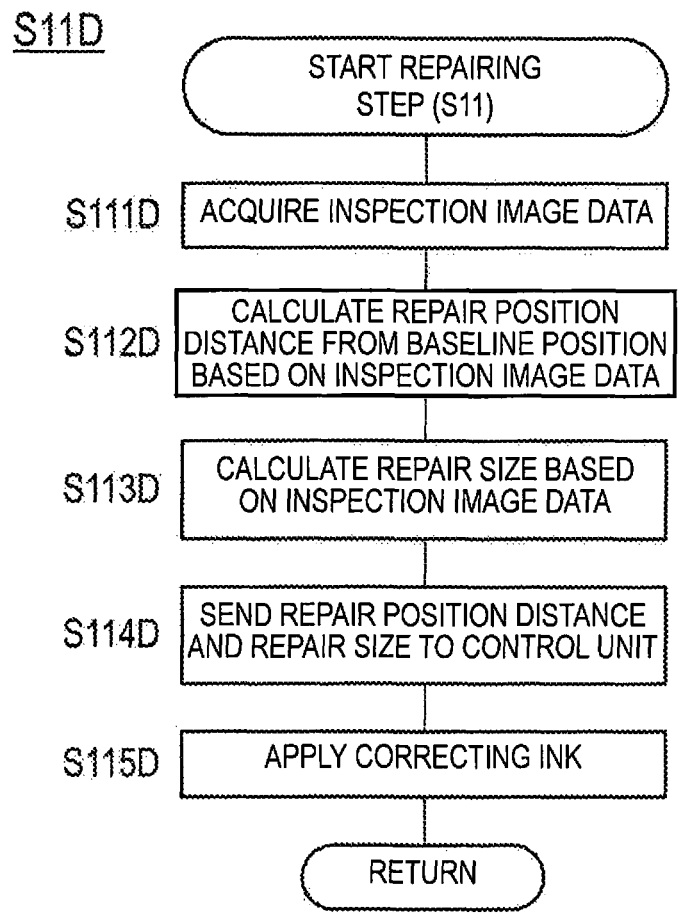
FIG. 33 is a flowchart of the repair step by the valve inkjet system.

FIG. 30 is a diagram illustrating the repair unit 160D by a valve inkjet system. FIG. 31 is a diagram illustrating the principle of the valve inkjet system. FIG. 32 is a diagram illustrating a state in which a plurality of coating units 500 of the valve inkjet system are disposed in a staggered pattern. FIG. 33 is a flowchart of the repair step S11D by the valve inkjet system.

The repair unit 160D of the valve inkjet system comprises a coating unit 500, a catalyst layer sensor 210, a correcting ink tank 220, a take-up roller 230, and a control unit 240, as illustrated in FIG. 30. Since the configurations of the catalyst layer sensor 210, the correcting ink tank 220, the take-up roller 230, and the control unit 240 are the same as in the repair unit 160A of the piezo inkjet system, the descriptions are omitted.

The coating unit 500 of the valve inkjet system applies the correcting ink 211B on the portion P1 from which the defect D has been removed by the removal unit 140. The coating unit 500 comprises a head 501, an ink chamber 502, a nozzle 503, and a valve 504, as illustrated in FIG. 31.

In a valve inkjet system, a signal is sent from the control unit 240 to the valve 504. As a result, the valve 504 is stroked downward in FIG. 31, and the correcting ink 211B in the ink chamber 502 is discharged from the nozzle 503 to the outside of the head 501. The droplet amount of the correcting ink 211B is controlled by the stroke amount and the number of stroke operations of the valve 504. The number of nozzles 503 per head 501 is one. In FIG. 31, the valve 504 of the coating unit 500 on the left side indicates a state in which the stroke is longer than the valve 504 of the coating unit 500 on the right side. As a result, more correcting ink 211B can be discharged from the coating unit 500 on the left side. In addition, the coating unit 500 is preferably disposed in a staggered pattern, as illustrated in FIG. 32.

Next, the repair step S11D conducted by the valve inkjet system will be described with reference to FIG. 33. Since the repair step S11D of the valve inkjet system is different from the repair step S11B of the continuous inkjet system, only in the Step S115D for applying the correcting ink 211B, only Step S115D for applying the correcting ink 211B will be described.

The coating unit 500 applies the correcting ink 211B on the portion P1 from which the defect D has been removed. Specifically, a signal is sent to the valve 504, and the valve 504 is stroked downward in FIG. 31 to apply the correcting ink 211B.

The membrane catalyst layer assembly 40 is manufactured with the steps described above.

As described above, if the inkjet system is a valve inkjet system, the droplets can be increased in size compared with the piezo inkjet system; therefore, the repair speed can be increased. Additionally, it is possible to handle cases in which the correcting ink 211B has high viscosity. Since the cathode side catalyst layer 231 is thicker than the anode side catalyst layer 221, it is preferable to apply the valve inkjet system when modifying the cathode side catalyst layer 231.

The four inkjet systems relating to the repair step S11 were described above.

Figure 34:
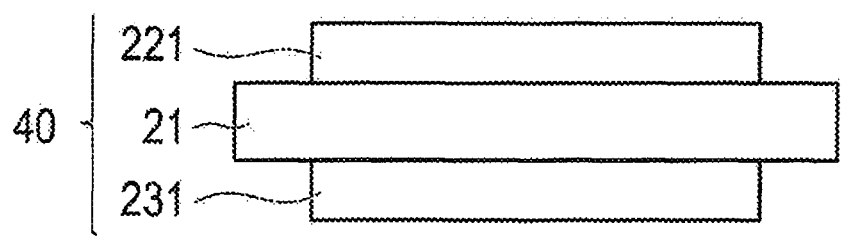
FIG. 34 is a diagram illustrating a membrane catalyst layer assembly manufactured by the method of manufacturing a membrane catalyst layer assembly according to the present embodiment.

The membrane catalyst layer assembly 40 is manufactured with the steps described above, as illustrated in FIG. 34.

As described above, the method for modifying a catalyst layer according to the present embodiment is a method for modifying a catalyst layer that modifies a catalyst layer 211 of a membrane catalyst layer assembly 40, which is manufactured by transferring the catalyst layer 211 formed on a transfer sheet 50 onto an electrolyte membrane 21. In the method for modifying a catalyst layer, the presence or absence of a defect D in the catalyst layer 211 is detected, the defect D is removed based on the size and position of the detected defect D, and the portion P1 from which the defect D has been removed is repaired by application thereto of a correcting ink 211B corresponding to the catalyst layer 211. According to this modification method, a defect D in a catalyst layer 211 is detected and the defect D is removed, after which a correcting ink 211B is applied and repaired; the yield of the membrane catalyst layer assembly 40 at the time of production is thereby improved. Therefore, it is possible to provide a method for modifying a catalyst layer whereby the yield of manufacturing the membrane catalyst layer assembly 40 can be improved.

Additionally, after the catalyst ink 211A that is coated on the transfer sheet 50 has been dried and the catalyst layer 211 has been formed, the presence or absence of a defect D is detected, and the defect D is removed. The catalyst layer 211 is then transferred onto an electrolyte membrane 21 and the transfer sheet 50 is peeled off of the catalyst layer 211, after which the portion P1 from which the defect D has been removed is repaired by application thereto of a correcting ink 211B. According to this modification method, since the correcting ink 211B is applied and repaired after the transfer sheet 50 is peeled off of the catalyst layer 211, the repair step S11 is carried out in the final step. Therefore, the yield of the membrane catalyst layer assembly 40 at the time of production is further improved.

In addition, the correcting ink 211B is applied with an inkjet system. According to this modification method, since the correcting ink 211B can be precisely applied, the shape of the catalyst layer 211 after repair can be made highly accurate.

Additionally, the inkjet system is a piezo inkjet system, a continuous inkjet system, an electrostatic inkjet system, or a valve inkjet system. If the inkjet system is a piezo inkjet system, positioning can be accurately carried out by numerous piezo elements 204; therefore, the portion P1 from which the defect D has been removed can be more accurately repaired. In addition, since droplets can be reduced in size with a piezo inkjet system, it is possible to improve the accuracy of the shape of the catalyst layer 211 that is formed by the correcting ink 211B. Additionally, if the inkjet system is a continuous inkjet system, the correcting ink 211B is circulated, and it is possible to prevent clogging of the nozzle 303. If the inkjet system is an electrostatic inkjet system, the correcting ink 211B automatically lands on the portion P1 from which the defect D has been removed without controlling the discharge direction of the correcting ink 211B; therefore, the repair step S11C is easily carried out. In addition, if the inkjet system is a valve inkjet system, the droplets can be increased in size compared with the piezo inkjet system; therefore, the repair speed can be improved. Additionally, it is possible to handle cases in which the correcting ink 211B has high viscosity.

Furthermore, the defect D is removed by irradiating laser light L on the defect D. According to this modification method, since the irradiation direction of the laser light L can be easily controlled, the defect D can be appropriately removed.

In addition, the presence or absence of a defect D in the catalyst layer 211 is again detected after removal of the defect D and before repair by application of the correcting ink 211B. According to this modification method, the defect D in the catalyst layer 211 can be removed more reliably.

Additionally, when the defect D is to be removed, removal can be effected up to the surface of the transfer sheet 50 on the side on which the catalyst layer 211 is coated. According to this modification method, removal up to the surface of the transfer sheet 50 is possible by irradiating a relatively high-energy laser light L, thereby improving the rate of production.

In addition, the quality of the repair of the catalyst layer 211 is inspected after the repair by application of the correcting ink 211B has been performed. According to this modification method, the catalyst layer 211 can be repaired more reliably.

In addition, as described above, the device 180 for modifying a catalyst layer according to the present embodiment is a device 180 for modifying a catalyst layer that modifies a catalyst layer 211 of a membrane catalyst layer assembly 40, which is manufactured by transferring the catalyst layer 211 formed on a transfer sheet 50 onto an electrolyte membrane 21. The device 180 for modifying a catalyst layer comprises a detection unit 130 that detects the presence or absence of a defect D in the catalyst layer 211, and a removal unit 140 that removes the defect D based on the size and position of the defect D that is detected by the detection unit 130. The device 180 for modifying a catalyst layer further comprises a repair unit 160 (160A, 160B, 160C, 160D) that repairs the portion P1 from which the defect D has been removed by the removal unit 140 by application thereto of a correcting ink 211B corresponding to the catalyst layer 211. According to this device 180 for modifying a catalyst layer, a defect D in a catalyst layer 211 is detected and the defect D is removed, after which a correcting ink 211B is applied and repaired; the yield of the membrane catalyst layer assembly 40 at the time of production is thereby improved. Therefore, it is possible to provide a device 180 for modifying a catalyst layer whereby the yield of manufacturing a membrane catalyst layer assembly 40 can be improved.

Additionally, the detection unit 130 detects the presence or absence of a defect D in the catalyst layer 211, which is formed after a catalyst ink 211A that is coated on the transfer sheet 50 has dried. Additionally, the repair unit 160 repairs the portion P1 from which the defect D has been removed, of the catalyst layer 211 that has been transferred onto the electrolyte membrane 21 and from which the transfer sheet 50 has been peeled off, by application thereto of a correcting ink 211B. According to this device 180 for modifying a catalyst layer, since the correcting ink 211B is applied and repaired after the transfer sheet 50 is peeled off of the catalyst layer 211, the repair step S11 is carried out in the final step. Therefore, the yield of the membrane catalyst layer assembly 40 at the time of production is further improved.

In addition, the repair unit 160 applies the correcting ink 211B with the inkjet system. According to this device 180 for modifying a catalyst layer, since the correcting ink 211B can be applied accurately, the shape of the catalyst layer 211 after repair can be formed with great precision.

Additionally, the inkjet system is a piezo inkjet system, a continuous inkjet system, an electrostatic inkjet system, or a valve inkjet system. If the inkjet system is a piezo inkjet system, positioning can be accurately carried out by numerous piezo elements 204; therefore, the portion P1 from which the defect D has been removed can be more accurately repaired. In addition, since droplets can be reduced in size with a piezo inkjet system, it is possible to improve the accuracy of the shape of the catalyst layer 211 that is formed by the correcting ink 211B. Additionally, if the inkjet system is a continuous inkjet system, the correcting ink 211B is circulated, and it is possible to prevent clogging of the nozzle 303. If the inkjet system is an electrostatic inkjet system, the correcting ink 211B automatically lands on the portion P1 from which the defect D has been removed without controlling the discharge direction of the correcting ink 211B; therefore, the repair step S11C is easily carried out. In addition, if the inkjet system is a valve inkjet system, the droplets can be increased in size compared with the piezo inkjet system; therefore, the repair speed can be improved. Additionally, it is possible to handle cases in which the correcting ink 211B has high viscosity.

In addition, the removal unit 140 removes the defect D by irradiating laser light L on the defect D. According to this device 180 for modifying a catalyst layer, since the irradiation direction of the laser light L can be easily controlled, the defect D can be appropriately removed.

Additionally, the detection unit 130 again detects the presence or absence of a defect D in the catalyst layer 211 from which the defect D has been removed. According to this device 180 for modifying a catalyst layer, the defect D in the catalyst layer 211 can be more reliably removed.

Additionally, the removal unit 140 removes up to the surface of the transfer sheet 50 on the side to which the catalyst layer 211 is formed. According to this device 180 for modifying a catalyst layer, it is possible to remove up to the surface of the transfer sheet 50 by irradiating a relatively high-energy laser light L, thereby improving the rate of production.

An inspection unit 170, which inspects the quality of the repair of the catalyst layer 211 after repair by application of the correcting ink 211B, is further provided. According to this device 180 for modifying a catalyst layer, the catalyst layer 211 can be more reliably repaired.

Second Embodiment

Next, the second embodiment of the present invention will be described. Descriptions of portions shared with the first embodiment will be omitted, and portions characteristic to only the second embodiment will be described. Compared with the method for modifying a catalyst layer according to the first embodiment, the method for modifying a catalyst layer according to the second embodiment is different in the method of removing the defect D in the catalyst layer and the method of repairing by application of a correcting ink 211B. The removal step and the repair step according to the second embodiment will be described below.

Figure 35:
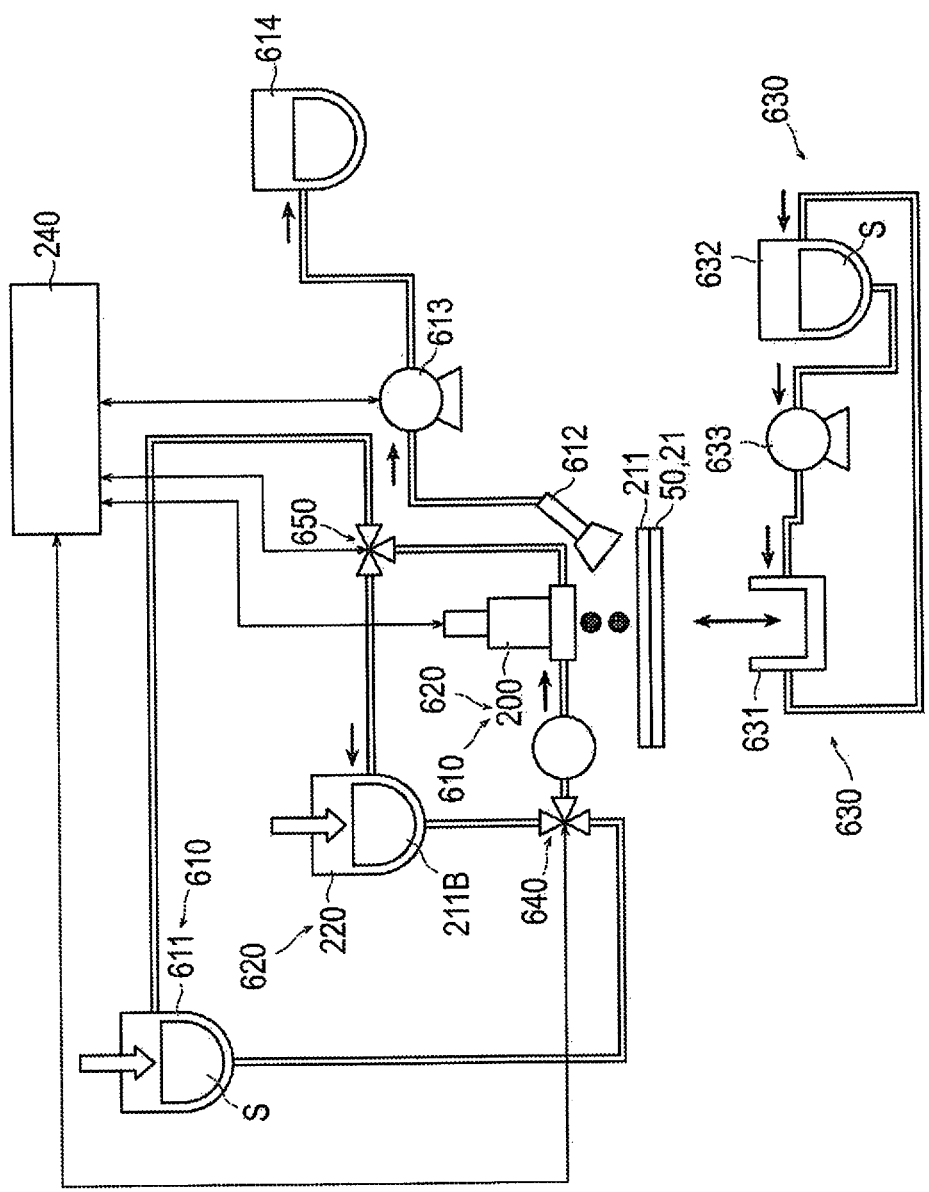
FIG. 35 is a diagram illustrating the device for modifying a catalyst layer according to a second embodiment of the present invention.
Figure 36:
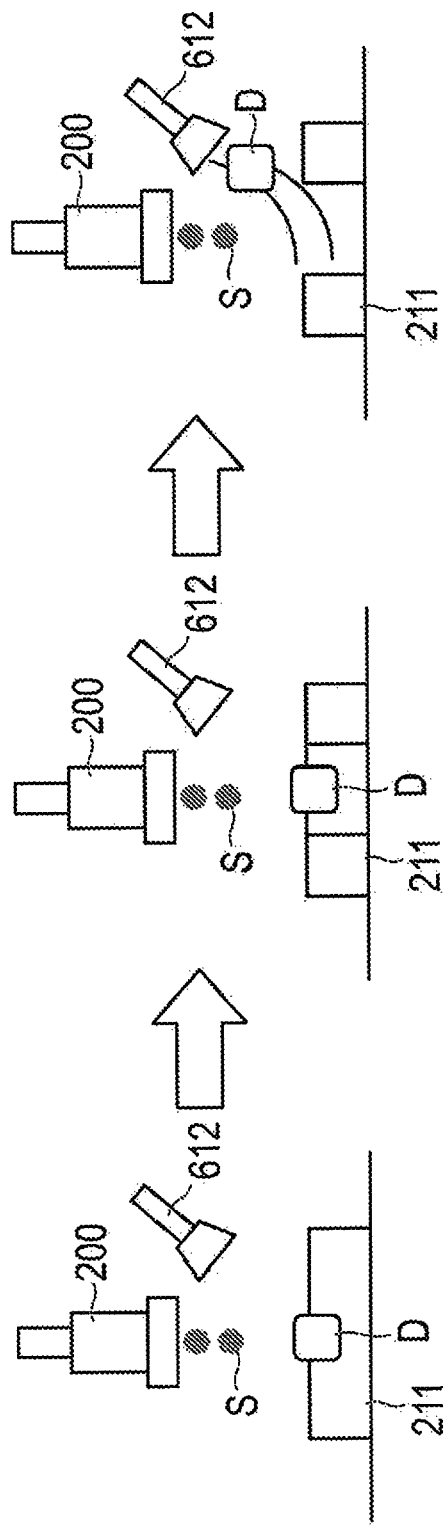
FIG. 36 is a diagram for explaining the removal step according to the second embodiment.
Figure 37:
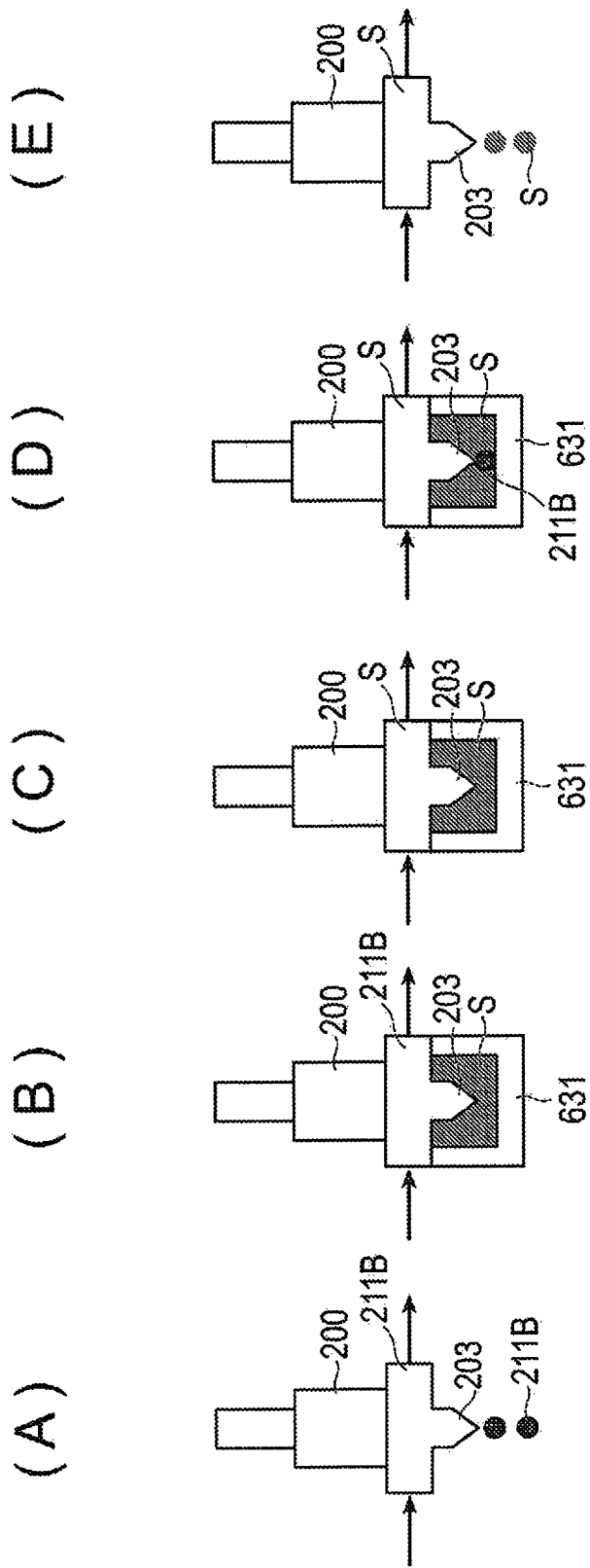
FIG. 37 is a diagram for explaining the action of a switching unit.

FIG. 35 is a diagram illustrating the device 600 for modifying a catalyst layer according to a second embodiment. FIG. 36 is a view for explaining the removal step according to the second embodiment. FIG. 37 is a view for explaining the action of a switching unit 630.

The device 600 for modifying a catalyst layer according to the second embodiment comprises a removal unit 610, a repair unit 620, a switching unit 630, a first three-way valve 640, and a second three-way valve 650, as illustrated in FIG. 35. Since configurations of the detection unit 130 and the inspection unit 170 are the same as in the device 180 for modifying a catalyst layer according to the first embodiment, the drawings and descriptions thereof are omitted.

The removal unit 610 comprises a coating unit 200 of a piezo inkjet system, a solvent tank 611, a defect recovery nozzle 612, a defect recovery pump 613, and a defect recovery tank 614. The coating unit 200 is not limited to the piezo inkjet system, and may be a coating unit 300 of a continuous inkjet system or a coating unit 500 of a valve inkjet system.

A solvent S capable of dissolving the catalyst layer 211 is stored in the solvent tank 611. Examples of the solvent S include solvents with high solubility, such as ketone-type, ether-type, ester-type, and hydrocarbon-type solvents. By pressurizing the solvent S stored in the solvent tank 611 with the pressurizing unit, which is not shown, the solvent S enters the ink chamber 202 of the coating unit 200, and is discharged from the nozzle 203 due to the deformation of the piezo elements 204. The solvent S is discharged in the vicinity of the defect D and dissolves the catalyst layer 211 that is disposed in the periphery of the defect D, as illustrated in FIG. 36. The solvent S may remove the defect D.

The defect recovery nozzle 612 collects the defect D by the defect recovery pump 613 suctioning the defect D as well as the catalyst layer 211 disposed in the periphery of the defect D, as illustrated in FIGS. 35 and 36. The defect D collected by the defect recovery tank 612 is transported to the defect recovery tank 614.

The repair unit 620 comprises a coating unit 200 of a piezo inkjet system and a correcting ink tank 220. That is, the same device may be used as the coating unit 200 that constitutes the removal unit 610 and the coating unit 200 that constitutes the repair unit 620. The coating unit 200 that constitutes the removal unit 610 and the coating unit 200 that constitutes the repair unit 620 may be configured differently from each other.

The first three-way valve 640 is switched so that the liquid that is introduced into the ink chamber 202 of the coating unit 200 is one of the correcting ink 211B and the solvent S.

The second three-way valve 650 is switched so that, of the liquid that is applied by the coating unit 200, the correcting ink 211B is returned to the correcting ink tank 220, and the solvent S is returned to the solvent tank 611.

After the correcting ink 211B is discharged, the switching unit 630 switches the content of the ink chamber 202 of the coating unit 200 from the correcting ink 211B to the solvent S, as illustrated in FIG. 37. The switching unit 630 comprises a nozzle cap 631, a solvent tank 632, and a cap filling pump 633.

The nozzle cap 631 is configured to fit the nozzle 203 of the coating unit 200 in a state in which the nozzle cap 631 is fitted to the nozzle 203, the solvent S is sent from the solvent tank 632 to the space between the nozzle cap 631 and the nozzle 203 by the cap filling pump 633. The switching method will be described in detail below with reference to FIG. 37.

First, the correcting ink 211B is applied from the nozzle 203 (refer to part (A) of FIG. 37). Next, the nozzle cap 631 is fitted on the nozzle 203 (refer to part (B) of FIG. 37). In this state, the space between the nozzle cap 631 and the nozzle 203 is filled with the solvent S through action of the cap filling pump 633. Next, the first three-way valve 640 is switched to introduce the solvent S into the ink chamber 202 (refer to part (C) of FIG. 37). Next, the solvent S is discharged from the nozzle 203 and the correcting ink 211B remaining in the nozzle 203 is discharged into the nozzle cap 631 (refer to part (D) of FIG. 37). Next, the nozzle cap 631 is separated from the nozzle 203 (refer to part (E) of FIG. 37). With the steps described above, the content of the ink chamber 202 of the coating unit 200 is switched from the correcting ink 211B to the solvent S.

The removal step and the repair step of the method for modifying a catalyst layer according to the second embodiment will be described below.

The removal unit 610 removes the defect D in the removal step. Specifically, the coating unit 200 applies a solvent S that is capable of dissolving the catalyst layer 211 onto the catalyst layer 211 that is disposed in the periphery of the defect D. At this time, the catalyst layer 211 is disposed on the transfer sheet 50. Then, the defect recovery nozzle 612 suctions the dissolved catalyst layer 211 and the defect D, thereby collecting and removing the defect D.

In the repair step, the portion P1 from which the defect D has been removed is repaired by application thereto of a correcting ink 211B corresponding to the catalyst layer 211 with the repair unit 620. At this time, the catalyst layer 211 is disposed on the electrolyte membrane 21. Since the method of applying the correcting ink 211B is the same as the method according to the first embodiment, the description thereof is omitted.

As described above, in the method for modifying a catalyst layer according to the second embodiment, a solvent S that is capable of dissolving the catalyst layer 211 is applied to the catalyst layer 211 that is disposed in the periphery of the defect D in order to remove the defect D. The defect D can be reliably removed according to this method.

In addition, the solvent S is applied with an inkjet system such as a piezo inkjet system, a continuous inkjet system, or a valve inkjet system, and the correcting ink 211B is applied by the same coating unit 200 as the coating unit 200 that applies the solvent S. Since the coating unit 200 that applies the solvent S and the coating unit 200 that applies the correcting ink 211B can be the same unit according to this method, equipment cost can be reduced.

Additionally, as described above, in the device 600 for modifying a catalyst layer according to the second embodiment, the removal unit 610 removes the defect D by application of a solvent S capable of dissolving the catalyst layer 211 onto the catalyst layer 211 that is disposed in the periphery of the defect D. The defect D can be reliably removed according to this device 600 for modifying a catalyst layer.

Additionally, the removal unit 610 applies the solvent S with an inkjet system such as a piezo inkjet system, a continuous inkjet system, or a valve inkjet system. The correcting ink 211B is applied with the same coating unit 200 as the coating unit 200 that applies the solvent S constituting the removal unit 610. Since the coating unit 200 that applies the solvent S and the coating unit 200 that applies the correcting ink 211B can be the same unit according to this device 600 for modifying a catalyst layer, equipment cost can be reduced.

The present invention is not limited to the embodiment described above, and various modifications are possible within the scope of the claims.

For example, the defect D was removed by irradiating a laser in the first embodiment, and the defect D was removed by application of a solvent S in the second embodiment, but the defect D may be removed by punching with a press.

Additionally, in the first embodiment described above, the repair unit 160 applies the correcting ink 211B by an inkjet system. However, the invention is not limited thereto, and the method of application may be a spray method, such as that employing ultrasonic spraying and ultrafine particle sorting to generate spraying; an extrusion coater method, such as that employing a syringe plunger, moono dispenser, and metering pump; or a squeegee method, such as a that employing a blade coater.

The intensity of the laser light L may be variable.

The invention claimed is:

1. A catalyst layer correction method for modifying a catalyst layer of a membrane catalyst layer assembly, which is manufactured by transferring the catalyst layer formed on a transfer sheet onto an electrolyte membrane, comprising:
    detecting a presence of a defect in the catalyst layer after a catalyst ink that is coated on the transfer sheet has been dried and the catalyst layer has been formed,
    removing the defect from the dried catalyst layer based on size and position of the defect that is detected,
    transferring the catalyst layer onto the electrolyte membrane and peeling off the transfer sheet from the catalyst layer, and
    repairing the defect by applying a correcting ink corresponding to the catalyst layer to a portion from which the defect has been removed after the catalyst layer has been transferred onto the electrolyte membrane and the transfer sheet has been peeled off.

2. The catalyst layer correction method according to claim 1, wherein
    the correcting ink is applied with an inkjet system.

3. The catalyst layer correction method according to claim 2, wherein
    the inkjet system is one of a piezo inkjet system, a continuous inkjet system, an electrostatic inkjet system, and a valve inkjet system.

4. The catalyst layer correction method according to claim 1, wherein
    the defect is removed by irradiating laser light on the defect.

5. The catalyst layer correction method according to claim 1, wherein
    the defect is removed by applying onto the catalyst layer a solvent that dissolves the catalyst layer in a region that is disposed around the defect.

6. The catalyst layer correction method according to claim 5, wherein the solvent is applied with an inkjet system comprising a coating unit, and the applying of the correcting ink is applied with the coating unit that is used to apply the solvent.

7. The catalyst layer correction method according to claim 1, further comprising
detecting a presence or absence of the defect in the catalyst layer after removal of the defect and before repair by application of the correcting ink.

8. The catalyst layer correction method according to claim 1, wherein
the removing of the defect comprises removing the defect up to a surface of the transfer sheet on a side on which the catalyst layer is formed.

9. The catalyst layer correction method according to claim 1, further comprising
inspecting a quality of a repair of the catalyst layer after repairing by application of the correcting ink.

10. A catalyst layer correction method that modifies a catalyst layer of a membrane catalyst layer assembly, which is manufactured by transferring the catalyst layer formed on a transfer sheet onto an electrolyte membrane, comprising:
detecting a presence of a defect in the catalyst layer,
removing the defect based on size and position of the detected defect, and
repairing the defect by applying a correcting ink corresponding to the catalyst layer with an inkjet system to a portion from which the defect has been removed after the catalyst layer has been transferred onto the electrolyte membrane and the transfer sheet has been peeled off.

11. A catalyst layer correction method for modifying a catalyst layer of a membrane catalyst layer assembly, which is manufactured by transferring the catalyst layer formed on a transfer sheet onto an electrolyte membrane, comprising:
detecting a presence of a defect in the catalyst layer after a catalyst ink that is coated on the transfer sheet has been dried and the catalyst layer has been formed,
removing the defect from the dried catalyst layer by irradiating a laser based on size and position of the defect that is detected, and
repairing the defect by applying a correcting ink corresponding to the catalyst layer to a portion from which the defect has been removed.

* * * * *